United States Patent
Zhu et al.

(10) Patent No.: US 12,166,743 B2
(45) Date of Patent: Dec. 10, 2024

(54) APPLICATION DISCOVERY METHOD, APPARATUS, AND SYSTEM, AND COMPUTER STORAGE MEDIUM

(71) Applicant: Huawei Technologies Co., Ltd., Shenzhen (CN)

(72) Inventors: Fangyuan Zhu, Beijing (CN); Yan Li, Beijing (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/958,138

(22) Filed: Sep. 30, 2022

(65) Prior Publication Data
US 2023/0025344 A1 Jan. 26, 2023

Related U.S. Application Data

(63) Continuation of application No. PCT/CN2021/086486, filed on Apr. 12, 2021.

(30) Foreign Application Priority Data

Apr. 10, 2020 (CN) ......................... 202010284829.4

(51) Int. Cl.
*H04L 61/4511* (2022.01)
*H04L 61/4541* (2022.01)

(52) U.S. Cl.
CPC ...... *H04L 61/4541* (2022.05); *H04L 61/4511* (2022.05)

(58) Field of Classification Search
CPC ............. H04L 61/4541; H04L 61/4511; H04L 61/4547; H04L 61/5007; H04L 61/5014
(Continued)

(56) References Cited

U.S. PATENT DOCUMENTS 10,299,128 B1 * 5/2019 Suthar ...................... H04L 9/30
11,095,606 B2 8/2021 Yang et al.
(Continued)

FOREIGN PATENT DOCUMENTS

CN 109640319 A 4/2019
CN 109729181 A 5/2019
(Continued)

OTHER PUBLICATIONS

Huawei et al., "Discovery of Edge Application Server based on AF Influence in Support of Edge Relocation," 3GPP TSG-SA WG2 Meeting #136-AH, S2-2000653, SA WG2 Temporary Document, revision of S2-xxxxx, Jan. 13-17, 2020, Incheon, South Korean, 4 pages.
(Continued)

*Primary Examiner* — Khanh Q Dinh
(74) *Attorney, Agent, or Firm* — Slater Matsil, LLP

(57) ABSTRACT

This application disclose an application discovery solutions. The application discovery method is applied to a first SMF network element, and includes: obtaining a first domain name requested by a terminal device; sending the first domain name to a second SMF network element; and receiving first information from the second SMF network element, where the first information includes information about a first application platform or an IP address of a DNS server corresponding to the first application platform, the first application platform is an application platform on which a first application corresponding to the first domain name is located, and the first information is for obtaining a target IP address corresponding to the first domain name. The terminal device may access, by using the target IP address, the first application corresponding to the first domain name.

18 Claims, 15 Drawing Sheets

(58) Field of Classification Search
USPC .................. 709/220, 224, 226, 228, 225
See application file for complete search history.

(56) References Cited

U.S. PATENT DOCUMENTS

| | | | | |
|---|---|---|---|---|
| 11,212,742 | B2 | 12/2021 | Xi | |
| 11,432,366 | B2 | 8/2022 | Zhu et al. | |
| 11,463,920 | B2 | 10/2022 | Zong et al. | |
| 11,528,770 | B2* | 12/2022 | Shu | H04W 76/10 |
| 11,553,064 | B2* | 1/2023 | Gan | H04W 36/13 |
| 11,558,346 | B2* | 1/2023 | Zong | H04L 61/5007 |
| 11,711,869 | B2* | 7/2023 | Li | H04M 15/66 |
| | | | | 370/329 |
| 2018/0115841 | A1* | 4/2018 | Apfel | G16H 40/67 |
| 2018/0115891 | A1* | 4/2018 | Kim | H04W 8/26 |
| 2018/0192971 | A1* | 7/2018 | Ballsieper | A61N 5/10 |
| 2018/0262974 | A1* | 9/2018 | Koundinya | H04W 8/005 |
| 2019/0261260 | A1* | 8/2019 | Dao | H04W 8/08 |
| 2019/0313479 | A1* | 10/2019 | Myhre | H04W 76/11 |
| 2020/0092727 | A1* | 3/2020 | Basu Mallick | H04W 8/22 |
| 2020/0329008 | A1* | 10/2020 | Dao | H04L 61/5007 |
| 2020/0329048 | A1* | 10/2020 | Bhattacharya | H04L 63/0272 |
| 2021/0029594 | A1* | 1/2021 | Kunz | H04W 36/00224 |
| 2021/0392561 | A1 | 12/2021 | Liang et al. | |
| 2022/0086846 | A1* | 3/2022 | Sharma | H04W 72/543 |
| 2023/0006965 | A1* | 1/2023 | Zhu | H04L 61/59 |
| 2023/0370419 | A1* | 11/2023 | Zhu | H04L 61/5007 |

FOREIGN PATENT DOCUMENTS

| | | | | |
|---|---|---|---|---|
| CN | 110149675 | A | | 8/2019 |
| CN | 110167003 | A | | 8/2019 |
| CN | 110248352 | A | | 9/2019 |
| CN | 110972126 | A | | 4/2020 |
| CN | 112422701 | A | | 2/2021 |
| CN | 113766629 | A | * | 12/2021 |
| EP | 4106271 | A1 | * | 12/2022 ............. H04L 41/00 |
| EP | 4166271 | A1 | * | 4/2023 ......... B23K 26/0006 |
| WO | 2019184722 | A1 | | 10/2019 |
| WO | 2019197426 | | | 10/2019 |
| WO | 2019229219 | A1 | | 12/2019 |

OTHER PUBLICATIONS

Huawei et al., "DNS based EAS discovery supporting session breakout," 3GPP TSG-WG SA2 Meeting #139E e-meeting, S2-2004117, SA WG2 Temporary Document, revision of S2-200xxxx, Jun. 1-12, 2020, Elbonia, 5 pages.

"Solution for the KI#1: Discovery of edge application server based on DNS mechanism," Source: Huawei, HiSilicon, Document for: Approval, Agenda Item: 8.5, Work Item / Release: FS_enh_EC / Rel-17, SA WG2 Temporary Document, SA WG2 Meeting #136, S2-1911170 (revision of S2-191xxxx), Reno, NV, USA, Nov. 18-22, 2019, 5 pages.

"3rd Generation Partnership Project; Technical Specification Group Services and System Aspects; Study on Enhancing Topology of SMF and UPF in 5G Networks (Release 16)," 3GPP TR 23.726 V1.2.0, Sep. 2018, 92 pages.

"3rd Generation Partnership Project; Technical Specification Group Services and System Aspects; Study on enhancement of support for Edge Computing in 5G Core network (5GC) (Release 17)," 3GPP TR 23.748 V0.3.0, Jan. 2020, 40 pages.

"3rd Generation Partnership Project; Technical Specification Group Services and System Aspects; System architecture for the 5G System (5GS); Stage 2 (Release 16)," 3GPP TS 23.501 V16.4.0, Mar. 2020, 430 pages.

"3rd Generation Partnership Project; Technical Specification Group Services and System Aspects; Procedures for the 5G System (5GS); Stage 2 (Release 16)," 3GPP TS 23.502 V16.4.0, Mar. 2020, 582 pages.

Contavalli, C. et al., "Client Subnet in DNS Queries," Internet Engineering Task Force (IETF), Request for Comments: 7871, Category: Informational, ISSN: 2070-1721, May 2016, 30 pages.

"NR 5G Network Functions SMF," Huaxia Mountain and River Snow, Retrieved from: https://blog.csdn.net/baidu_41616132/article/details/96160116, Jul. 16, 2019, 3 pages (with Partial Translation).

"SMF Service Areas," Source: Ericsson, Document for: Approval, Agenda Item:6.5.3, Work Item / Release: 5GS_ph1 / Rel-15, SA WG2, Temporary Document, SA WG2 Meeting #122, San Jose Del Cabo, Mexico, S2-174193 (revision of S2-17xxxx), Jun. 26-30, 2017, 17 pages.

"Correction to N16a for the transfer of N4 requests from SMF / responses from local UPF" SA WG2 Meeting #136, S2-1912072 (revision of S2-1910948), Reno, US, , Nokia, Nokia Shanghai Bell, NTT Docomo, Nov. 18-22, 2019, 10 pages.

* cited by examiner

APPLICATION DISCOVERY METHOD, APPARATUS, AND SYSTEM, AND COMPUTER STORAGE MEDIUM

CROSS-REFERENCE TO RELATED APPLICATIONS

This application is a continuation of International Application No. PCT/CN2021/086486, filed on Apr. 12, 2021, which claims priority to Chinese Patent Application No. 202010284829.4, filed on Apr. 10, 2020. The disclosures of the aforementioned applications are hereby incorporated by reference in their entireties.

TECHNICAL FIELD

The present disclosure relates to the field of wireless communication technologies, and in particular, to an application discovery method, apparatus, and system, and a computer storage medium.

BACKGROUND

In a 5th generation mobile communication technology (5G), when a terminal device establishes a protocol data unit (PDU) session at a first location, the PDU session corresponds to an anchor user plane function (UPF) network element. The anchor UPF network element is also referred to as a PDU session anchor (PSA), and is managed by an anchor session management function SMF (A-SMF) network element.

When the terminal device moves from the first location to a second location, an access network (AN) element currently corresponding to the PDU session cannot be directly connected to the anchor UPF network element. In this case, an intermediate UPF (I-UPF) network element needs to be inserted for the PDU session, to establish a user plane path between an access network and the anchor UPF network element. The I-UPF network element is managed by an intermediate SMF (I-SMF) network element. In this way, the same PDU session corresponds to two SMF network elements (namely, the A-SMF network element and the I-SMF network element). In this scenario, how to implement application discovery (that is, how to implement application access of the terminal device) is an urgent problem to be resolved currently.

SUMMARY

A technical problem to be resolved in this application is how to implement application discovery in a scenario in which an I-SMF network element is inserted for a PDU session of a terminal device in a system.

According to a first aspect, this application provides an application discovery method, applied to a first SMF network element, where the first SMF network element is an A-SMF network element, and the application discovery method includes: obtaining a first domain name requested by a terminal device; sending the first domain name to a second SMF network element, where the second SMF network element is an I-SMF network element; and receiving first information from the second SMF network element, where the first information includes information about a first application platform or an IP address of a DNS server corresponding to the first application platform, the first application platform is an application platform on which a first application corresponding to the first domain name is located, and the first information is for obtaining a target IP address corresponding to the first domain name. The terminal device may access, by using the target IP address, the first application corresponding to the first domain name.

In a scenario in which the I-SMF network element is inserted for a PDU session of the terminal device in a system, the first application platform on which the first application corresponding to the first domain name is located may be determined through interaction between the A-SMF network element and the I-SMF network element, to implement application discovery.

In an optional implementation, the obtaining a first domain name requested by a terminal device includes: receiving the first domain name from a UPF network element, where the first domain name is received by the UPF network element from the terminal device.

In an optional implementation, before the obtaining a first domain name requested by a terminal device, the application discovery method further includes: receiving, from the second SMF network element, a location information list corresponding to the second SMF network element, where the location information list includes location information of at least one application platform corresponding to the second SMF network element; and determining second information based on the location information list, and sending the second information to the second SMF network element, where the second information includes the first domain name and location information of at least one application platform on which the first application corresponding to the first domain name is located.

In an optional implementation, the sending the first domain name to a second SMF network element includes: determining, based on the first domain name and a stored correspondence between location information of an application platform and a domain name of an application, the location information of the at least one application platform on which the first application corresponding to the first domain name is located; and if the location information list includes the location information of the at least one application platform on which the first application is located, sending the first domain name to the second SMF network element.

In an optional implementation, the information about the first application platform includes location information of the first application platform or an IP address corresponding to the first application platform.

In an optional implementation, the location information list includes a DNAI list, and the location information of the at least one application platform on which the first application corresponding to the first domain name is located includes a DNAI corresponding to the at least one application platform on which the first application is located.

In the foregoing optional implementations, if a plurality of application platforms on which the first application corresponding to the first domain name is located are deployed in the system (that is, the first domain name corresponds to the plurality of application platforms), the first application platform is determined based on location information of the terminal device. In this embodiment of this application, the first application platform can be an application platform that is in the plurality of application platforms corresponding to the first domain name and that is close to the terminal device, to reduce a service delay.

According to a second aspect, this application provides an application discovery method, applied to a second SMF network element, where the second SMF network element is an I-SMF network element, and the application discovery method includes: receiving, from a first SMF network element, a first domain name requested by a terminal device, where the first SMF network element is an A-SMF network element; determining, based on current location information of the terminal device and location information of at least one application platform on which a first application corresponding to the first domain name is located, a first application platform on which the first application corresponding to the first domain name is located; and sending first information to the first SMF network element, where the first information includes information about the first application platform or an IP address of a DNS server corresponding to the first application platform, and the first information is for obtaining a target IP address corresponding to the first domain name. The terminal device may access, by using the target IP address, the first application corresponding to the first domain name.

In a scenario in which the I-SMF network element is inserted for a PDU session of the terminal device in a system, the first application platform on which the first application corresponding to the first domain name is located may be determined through interaction between the A-SMF network element and the I-SMF network element, to implement application discovery.

In an optional implementation, before the receiving, from a first SMF network element, a first domain name requested by a terminal device, the application discovery method further includes: sending, to a first network element, a location information list corresponding to the second SMF network element, where the location information list includes location information of at least one application platform corresponding to the second SMF network element, and the first network element is the first SMF network element or a UDR; and receiving second information from the first network element, where the second information includes the first domain name and the location information of the at least one application platform on which the first application corresponding to the first domain name is located.

In an optional implementation, the information about the first application platform includes location information of the first application platform or an IP address corresponding to the first application platform.

In an optional implementation, the location information list includes a DNAI list, and the location information of the at least one application platform on which the first application corresponding to the first domain name is located includes a DNAI corresponding to the at least one application platform on which the first application is located.

In the foregoing optional implementations, if a plurality of application platforms on which the first application corresponding to the first domain name is located are deployed in the system (that is, the first domain name corresponds to the plurality of application platforms), the first application platform is determined based on location information of the terminal device. In this embodiment of this application, the first application platform can be an application platform that is in the plurality of application platforms corresponding to the first domain name and that is close to the terminal device, to reduce a service delay.

According to a third aspect, this application provides an application discovery method, applied to a first SMF network element, where the first SMF network element is an I-SMF network element, and the application discovery method includes: sending, to a first network element, a location information list corresponding to the first SMF network element, where the location information list includes location information of at least one application platform corresponding to the first SMF network element, the first network element is a second SMF network element or a UDR, and the second SMF network element is an A-SMF network element; receiving first information from the first network element, where the first information includes a domain name of at least one application corresponding to the first SMF network element and location information of at least one application platform on which each of the at least one application is located; obtaining a first domain name requested by a terminal device, where the first information includes the first domain name; determining, based on location information of the terminal device, the first domain name, and the first information, a first application platform on which a first application corresponding to the first domain name is located; and obtaining, based on an IP address corresponding to the first application platform or an IP address of a DNS server corresponding to the first application platform, a target IP address corresponding to the first domain name.

In a scenario in which the I-SMF network element is inserted for a PDU session of the terminal device in a system, the I-SMF network element may obtain application information (including the domain name of the at least one application corresponding to the first SMF network element and the location information of the at least one application platform on which each of the at least one application is located) of the I-SMF network element from the first network element, to determine the first application platform on which the first application corresponding to the first domain name is located, to implement application discovery.

In an optional implementation, the obtaining a first domain name requested by a terminal device includes: receiving the first domain name from a UPF network element, where the first domain name is received by the UPF network element from the terminal device.

In an optional implementation, the determining, based on location information of the terminal device, the first domain name, and the first information, a first application platform on which a first application corresponding to the first domain name is located includes: determining, based on the first domain name and the first information, location information of at least one application platform on which the first application corresponding to the first domain name is located; and determining, based on the location information of the terminal device and the location information of the at least one application platform on which the first application is located, the first application platform on which the first application corresponding to the first domain name is located.

In an optional implementation, the location information list includes a DNAI list, and the location information of the at least one application platform on which the first application corresponding to the first domain name is located includes a DNAI corresponding to the at least one application platform on which the first application is located.

In the foregoing optional implementations, if a plurality of application platforms on which the first application corresponding to the first domain name is located are deployed in the system (that is, the first domain name corresponds to the plurality of application platforms), the first application platform is determined based on the location information of the terminal device. In this embodiment of this application, the first application platform can be an application platform that is in the plurality of application platforms corresponding to the first domain name and that is close to the terminal device, to reduce a service delay.

According to a fourth aspect, this application provides a first application discovery apparatus. The apparatus includes a first SMF network element. The apparatus may be a network device or a chip in the network device. Specifically, the first application discovery apparatus includes: a transceiver module, further configured to send a first domain name to a second SMF network element, where the second SMF network element is an I-SMF network element; and a processing module, configured to receive first information from the second SMF network element, where the first information includes information about a first application platform or an IP address of a DNS server corresponding to the first application platform, the first application platform is an application platform on which a first application corresponding to the first domain name is located, and the first information is for obtaining a target IP address corresponding to the first domain name.

In an optional implementation, when obtaining the first domain name requested by a terminal device, the transceiver module is specifically configured to: receive the first domain name from a UPF network element, where the first domain name is received by the UPF network element from the terminal device.

In an optional implementation, the transceiver module is further configured to: receive, from the second SMF network element, a location information list corresponding to the second SMF network element, where the location information list includes location information of at least one application platform corresponding to the second SMF network element; and determine second information based on the location information list, and send the second information to the second SMF network element, where the second information includes the first domain name and location information of at least one application platform on which the first application corresponding to the first domain name is located.

In an optional implementation, when sending the first domain name to the second SMF network element, the transceiver module is specifically configured to: determine, based on the first domain name and a stored correspondence between location information of an application platform and a domain name of an application, the location information of the at least one application platform on which the first application corresponding to the first domain name is located; and if the location information list includes the location information of the at least one application platform on which the first application is located, send the first domain name to the second SMF network element.

In an optional implementation, the information about the first application platform includes location information of the first application platform or an IP address corresponding to the first application platform.

In an optional implementation, the location information list includes a DNAI list, and the location information of the at least one application platform on which the first application corresponding to the first domain name is located includes a DNAI corresponding to the at least one application platform on which the first application is located.

It should be noted that when the apparatus is the network device, the processing module may be a processor, and the transceiver module may be a transceiver. The network device may further include a storage module, and the storage module may be a memory. The storage module is configured to store instructions, and the processing module executes the instructions stored in the storage module. When the apparatus is the chip in the network device, the processing module may be a processor, and the transceiver module may be an input/output interface, a pin, a circuit, or the like. The processing module executes instructions stored in a storage module. The storage module may be a storage module (for example, a register or a cache) in the chip, or may be a storage module (for example, a read-only memory (ROM) or a random access memory (RAM)) that is in the network device and that is located outside the chip. Based on a same inventive concept, for problem-resolving principles and beneficial effects of the first application discovery apparatus, refer to the method in the first aspect and the possible implementations of the first aspect and beneficial effects thereof. Therefore, for implementation of the first application discovery apparatus, refer to the method in the first aspect and the possible implementations of the first aspect. Repeated parts are not described again.

According to a fifth aspect, this application provides a second application discovery apparatus. The apparatus includes a second SMF network element. The apparatus may be a network device or a chip in the network device. Specifically, the second application discovery apparatus includes: a transceiver module, configured to receive, from a first SMF network element, a first domain name requested by a terminal device; and a processing module, configured to determine, based on current location information of the terminal device and location information of at least one application platform on which a first application corresponding to the first domain name is located, a first application platform on which the first application corresponding to the first domain name is located.

The transceiver module is further configured to send first information to the first SMF network element, where the first information includes information about the first application platform or an IP address of a DNS server corresponding to the first application platform, and the first information is for obtaining a target IP address corresponding to the first domain name. The terminal device may access, by using the target IP address, the first application corresponding to the first domain name.

In an optional implementation, the transceiver module is further configured to: send, to a first network element, a location information list corresponding to the second SMF network element, where the location information list includes location information of at least one application platform corresponding to the second SMF network element, and the first network element is the first SMF network element or a UDR; and receive second information from the first network element, where the second information includes the first domain name and the location information of the at least one application platform on which the first application corresponding to the first domain name is located.

In an optional implementation, the information about the first application platform includes location information of the first application platform or an IP address corresponding to the first application platform.

In an optional implementation, the location information list includes a DNAI list, and the location information of the at least one application platform on which the first application corresponding to the first domain name is located includes a DNAI corresponding to the at least one application platform on which the first application is located.

It should be noted that when the apparatus is the network device, the processing module may be a processor, and the transceiver module may be a transceiver. The network device may further include a storage module, and the storage module may be a memory. The storage module is configured to store instructions, and the processing module executes the instructions stored in the storage module. When the apparatus is the chip in the network device, the processing module may be a processor, and the transceiver module may be an input/output interface, a pin, a circuit, or the like. The processing module executes instructions stored in a storage module. The storage module may be a storage module (for example, a register or a cache) in the chip, or may be a storage module (for example, a ROM or a RAM) that is in the network device and that is located outside the chip. Based on a same inventive concept, for problem-resolving principles and beneficial effects of the second application discovery apparatus, refer to the method in the second aspect and the possible implementations of the second aspect and beneficial effects thereof. Therefore, for implementation of the second application discovery apparatus, refer to the method in the second aspect and the possible implementations of the second aspect. Repeated parts are not described again.

According to a sixth aspect, this application provides an application discovery apparatus. The apparatus includes a first SMF network element. The apparatus may be a network device or a chip in the network device. Specifically, the application discovery apparatus includes: a transceiver module, configured to: send, to a first network element, a location information list corresponding to the first SMF network element, where the location information list includes location information of at least one application platform corresponding to the first SMF network element, and the first network element is a second SMF network element or a UDR; receive first information from the first network element, where the first information includes a domain name of at least one application corresponding to the first SMF network element and location information of at least one application platform on which each of the at least one application is located; and obtain a first domain name requested by a terminal device, where the first information includes the first domain name; and a processing module, configured to determine, based on location information of the terminal device, the first domain name, and the first information, a first application platform on which a first application corresponding to the first domain name is located.

The transceiver module is further configured to obtain, based on an IP address corresponding to the first application platform or an IP address of a DNS server corresponding to the first application platform, a target IP address corresponding to the first domain name.

In an optional implementation, when obtaining the first domain name requested by the terminal device, the transceiver module is specifically configured to: receive the first domain name from a UPF network element, where the first domain name is received by the UPF network element from the terminal device.

In an optional implementation, when determining, based on the location information of the terminal device, the first domain name, and the first information, the first application platform on which the first application corresponding to the first domain name is located, the processing module is specifically configured to: determine, based on the first domain name and the first information, location information of at least one application platform on which the first application corresponding to the first domain name is located; and determine, based on the location information of the terminal device and the location information of the at least one application platform on which the first application is located, the first application platform on which the first application corresponding to the first domain name is located.

In an optional implementation, the location information list includes a DNAI list, and the location information of the at least one application platform on which the first application corresponding to the first domain name is located includes a DNAI corresponding to the at least one application platform on which the first application is located.

It should be noted that when the apparatus is the network device, the processing module may be a processor, and the transceiver module may be a transceiver. The network device may further include a storage module, and the storage module may be a memory. The storage module is configured to store instructions, and the processing module executes the instructions stored in the storage module. When the apparatus is the chip in the network device, the processing module may be a processor, and the transceiver module may be an input/output interface, a pin, a circuit, or the like. The processing module executes instructions stored in a storage module. The storage module may be a storage module (for example, a register or a cache) in the chip, or may be a storage module (for example, a ROM or a RAM) that is in the network device and that is located outside the chip. Based on a same inventive concept, for problem-resolving principles and beneficial effects of the application discovery apparatus, refer to the method in the third aspect and the possible implementations of the third aspect and beneficial effects thereof. Therefore, for implementation of the application discovery apparatus, refer to the method in the third aspect and the possible implementations of the third aspect. Repeated parts are not described again.

According to a seventh aspect, this application provides a computer-readable storage medium. The computer-readable storage medium stores instructions. When the instructions are run, a network device is enabled to perform the method in the first aspect and the possible implementations of the first aspect and obtain beneficial effects thereof. Repeated parts are not described again.

According to an eighth aspect, this application provides a computer-readable storage medium. The computer-readable storage medium stores instructions. When the instructions are run, a network device is enabled to perform the method in the second aspect and the possible implementations of the second aspect and obtain beneficial effects thereof. Repeated parts are not described again.

According to a ninth aspect, this application provides a computer-readable storage medium. The computer-readable storage medium stores instructions. When the instructions are run, a network device is enabled to perform the method in the third aspect and the possible implementations of the third aspect and obtain beneficial effects thereof. Repeated parts are not described again.

According to a tenth aspect, this application provides an application discovery system. The application discovery system includes: a second SMF network element, configured to send, to a first network element, a location information list corresponding to the second SMF network element, where the location information list includes location information of at least one application platform corresponding to the second SMF network element, the first network element is a first SMF network element or a UDR, the first SMF network element is an A-SMF network element, and the second SMF network element is an I-SMF network element; the first network element, configured to: determine second information based on the location information list, and send the second information to the second SMF network element, where the second information includes a first domain name and location information of at least one application platform on which a first application corresponding to the first domain name is located; and the first SMF network element, configured to obtain the first domain name requested by a terminal device.

The first SMF network element is further configured to send the first domain name to the second SMF network element.

The second SMF network element is further configured to determine, based on current location information of the terminal device and the location information of the at least one application platform on which the first application corresponding to the first domain name is located, a first application platform on which the first application corresponding to the first domain name is located.

The second SMF network element is further configured to send first information to the first SMF network element, where the first information includes information about the first application platform or an IP address of a DNS server corresponding to the first application platform, and the first information is for obtaining a target IP address corresponding to the first domain name. The terminal device may access, by using the target IP address, the first application corresponding to the first domain name.

In an optional implementation, when obtaining the first domain name requested by the terminal device, the first SMF network element is specifically configured to receive the first domain name from a UPF network element, where the first domain name is received by the UPF network element from the terminal device.

In an optional implementation, when sending the first domain name to the second SMF network element, the first SMF network element is specifically configured to: determine, based on the first domain name and a stored correspondence between location information of an application platform and a domain name of an application, the location information of the at least one application platform on which the first application corresponding to the first domain name is located; and if the location information list includes the location information of the at least one application platform on which the first application is located, send the first domain name to the second SMF network element.

In an optional implementation, the information about the first application platform includes location information of the first application platform or an IP address corresponding to the first application platform.

In an optional implementation, the location information list includes a DNAI list, and the location information of the at least one application platform on which the first application corresponding to the first domain name is located includes a DNAI corresponding to the at least one application platform on which the first application is located.

In this embodiment of this application, the first application platform on which the first application corresponding to the first domain name is located can be determined through interaction between the A-SMF network element and the I-SMF network element, to implement application discovery.

According to an eleventh aspect, this application provides an application discovery system. The application discovery system includes: a first SMF network element, configured to send, to a first network element, a location information list corresponding to the first SMF network element, where the location information list includes location information of at least one application platform corresponding to the first SMF network element, the first network element is a second SMF network element or a UDR, the second SMF network element is an A-SMF network element, and the first SMF network element is an I-SMF network element; and the first network element, configured to: determine first information based on the location information list, and send the first information to the first SMF network element, where the first information includes a first domain name and location information of at least one application platform on which a first application corresponding to the first domain name is located.

The first SMF network element is further configured to obtain the first domain name requested by a terminal device, where the first information includes the first domain name.

The first SMF network element is further configured to determine, based on location information of the terminal device, the first domain name, and the first information, a first application platform on which the first application corresponding to the first domain name is located.

The first SMF network element is further configured to obtain, based on an IP address corresponding to the first application platform or an IP address of a DNS server corresponding to the first application platform, a target IP address corresponding to the first domain name.

In an optional implementation, when obtaining the first domain name requested by the terminal device, the first SMF network element is specifically configured to receive the first domain name from a UPF network element, where the first domain name is received by the UPF network element from the terminal device.

In an optional implementation, when determining, based on the location information of the terminal device, the first domain name, and the first information, the first application platform on which the first application corresponding to the first domain name is located, the first SMF network element is specifically configured to: determine, based on the first domain name and the first information, the location information of the at least one application platform on which the first application corresponding to the first domain name is located; and determine, based on the location information of the terminal device and the location information of the at least one application platform on which the first application is located, the first application platform on which the first application corresponding to the first domain name is located.

In an optional implementation, the location information list includes a DNAI list, and the location information of the at least one application platform on which the first application corresponding to the first domain name is located includes a DNAI corresponding to the at least one application platform on which the first application is located.

In this embodiment of this application, the first application platform on which the first application corresponding to the first domain name is located can be determined through interaction between the A-SMF network element and the I-SMF network element, to implement application discovery.

DETAILED DESCRIPTION OF ILLUSTRATIVE EMBODIMENTS

Figure 1:
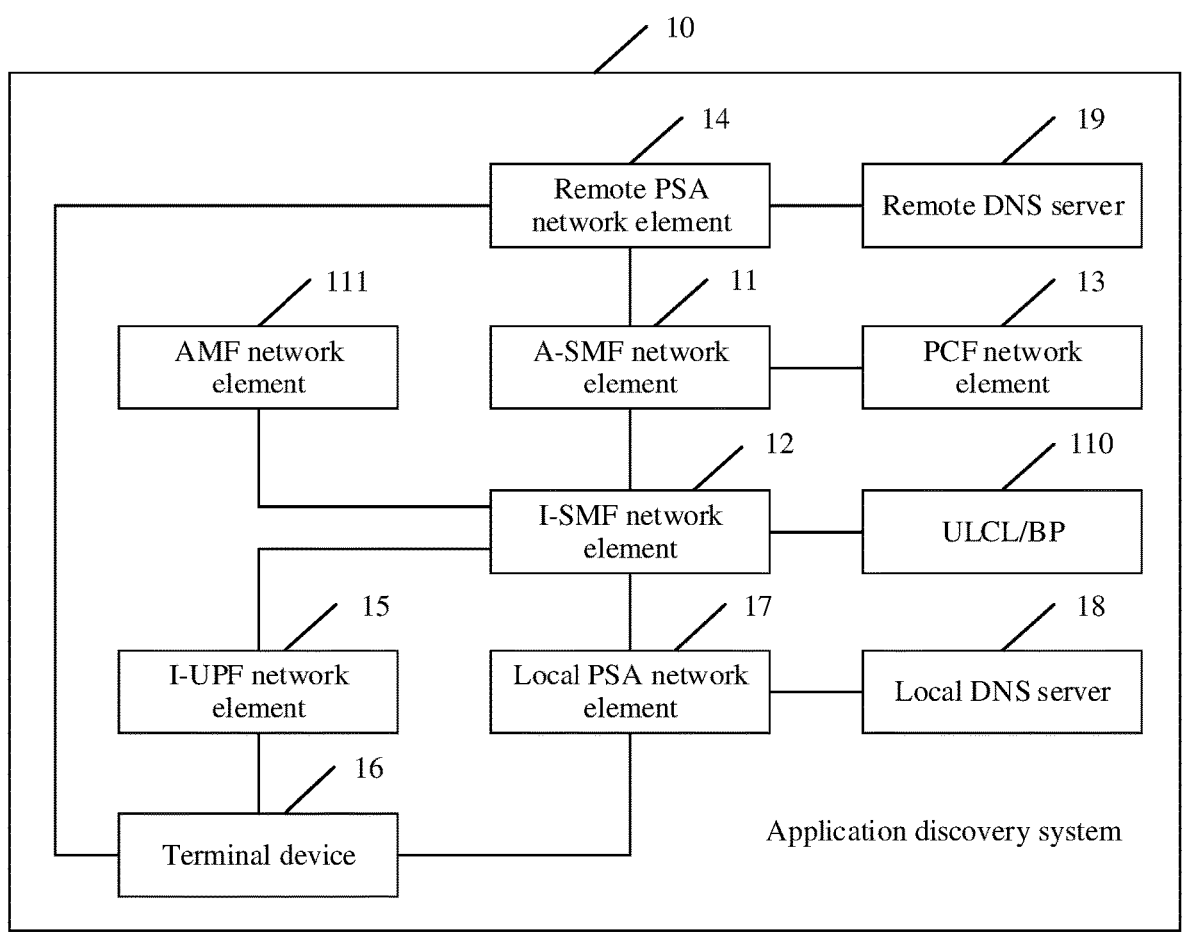
FIG. 1 is a schematic diagram of a framework of an application discovery system according to an embodiment of this application.

The following describes embodiments of this application in detail with reference to the accompanying drawings in embodiments of this application.

It should be noted that an application discovery method in embodiments of this application may be applied to any communication system in which an I-SMF network element is inserted for a PDU session of a terminal device. In other words, if a same PDU session in a communication system corresponds to two SMF network elements (which are respectively an A-SMF network element and the I-SMF network element), the communication system may implement the application discovery method in embodiments of this application. The communication system may be, for example, a 5G communication system or a future communication system. The following uses application discovery systems shown in FIG. 1 and FIG. 3 as examples to describe the communication system to which the application discovery method in embodiments of this application is applicable.

The following describes network elements that may be included in the communication system to which this application is applicable.

A terminal device may include a handheld device, a vehicle-mounted device, a wearable device, or a computing device having a wireless communication function or another processing device connected to a wireless modem, and user equipment (UE), a mobile station (MS), terminal equipment (TE), and the like that are in various forms.

A (radio) access network ((R)AN) device may be configured to implement functions such as a radio physical layer function, radio resource management, radio access control, and mobility management. The RAN device may include a base station, for example, an access node (Access Point, AP), a next generation NodeB (gNB), a next generation evolved NodeB (ng-eNB, gNB), a transmission reception point (TRP), a transmission point (TP), or another access node in a 5G system. It should be understood that, in the following descriptions, the RAN devices are collectively referred to as the RAN device for ease of description.

A UPF network element is a user plane function network element, and may be connected to an external data network. Main functions include functions related to a user plane, for example, data packet routing and transmission, packet detection, service usage reporting, QoS processing, lawful interception, uplink packet detection, and downlink data packet storage.

Main functions of a mobility management function (AMF) network element include functions related to access and mobility, for example, connection management, mobility management, registration management, access authentication and authorization, reachability management, and security context management.

Main functions of an SMF network element include session-related functions, for example, session management (for example, session establishment, modification, and release, including tunnel maintenance between the UPF and the RAN), selection and control of the UPF, service and session continuity (SSC) mode selection, and roaming.

Main functions of a policy control function (PCF) network element include policy-related functions, for example, formulating a unified policy, providing policy control, and obtaining subscription information related to a policy decision.

An application function (AF) network element may be a third-party application control platform, or may be a device deployed by an operator. Main functions of the application function network element include providing application-related information and serving a plurality of application servers.

A main function of a data network (DN) is providing a specific data service, for example, an operator service, Internet access, or a third-party service.

FIG. 1 is a schematic diagram of a framework of an application discovery system according to an embodiment of this application. As shown in FIG. 1, the application discovery system 10 may include an A-SMF network element 11, an I-SMF network element 12, a PCF network element 13, a remote PSA network element 14, an I-UPF network element 15, a terminal device 16, a local PSA network element 17, a local domain name system (DNS) server 18, a remote DNS server 19, an uplink classifier (ULCL)/ branching point (BP) 110, and an AMF network element 111.

The A-SMF network element 11, the I-SMF network element 12, the PCF network element 13, the remote PSA network element 14, the I-UPF network element 15, the local PSA network element 17, and the AMF network element 111 are all core network elements.

Specifically, the A-SMF network element 11 is an anchor SMF network element corresponding to a PDU session established by the terminal device 16 at a first location, and is configured to manage the remote PSA network element 14. The remote PSA network element 14 is an anchor UPF network element (namely, the first anchor UPF network element) corresponding to the PDU session at the first location.

In this embodiment of this application, the PCF network element 13 is configured to store application information, so that the A-SMF network element 11 obtains the application information.

When the terminal device 16 moves from the first location to a second location, an access network element currently corresponding to the PDU session cannot be directly connected to the remote PSA network element 14. In this case, the I-UPF network element 15 and the I-SMF network element 12 are inserted for the PDU session in the application discovery system 10. The I-UPF network element 15 is configured to establish a user plane path between an access network and the remote PSA network element 14, and the I-SMF network element 12 is configured to manage the I-UPF network element 15.

The local PSA network element 17 is an anchor UPF network element (namely, the second anchor UPF network element) corresponding to the PDU session at the second location after the terminal device 16 moves from the first location to the second location. The I-SMF network element 12 is further configured to manage the local PSA network element 17.

Figure 2A:
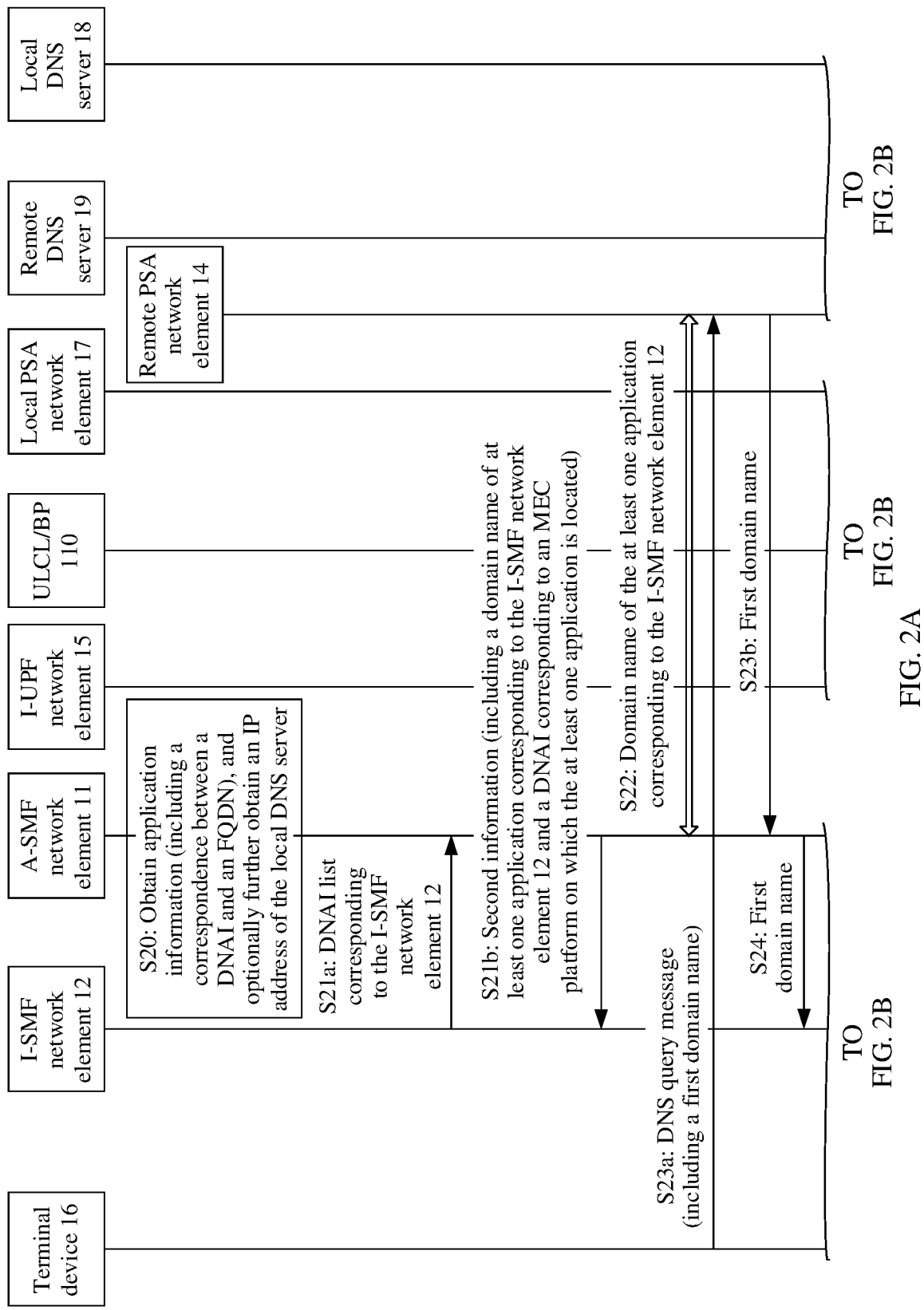
FIG. 2A and FIG. 2B are a schematic flowchart of an application discovery method according to an embodiment of this application.
Figure 2B:
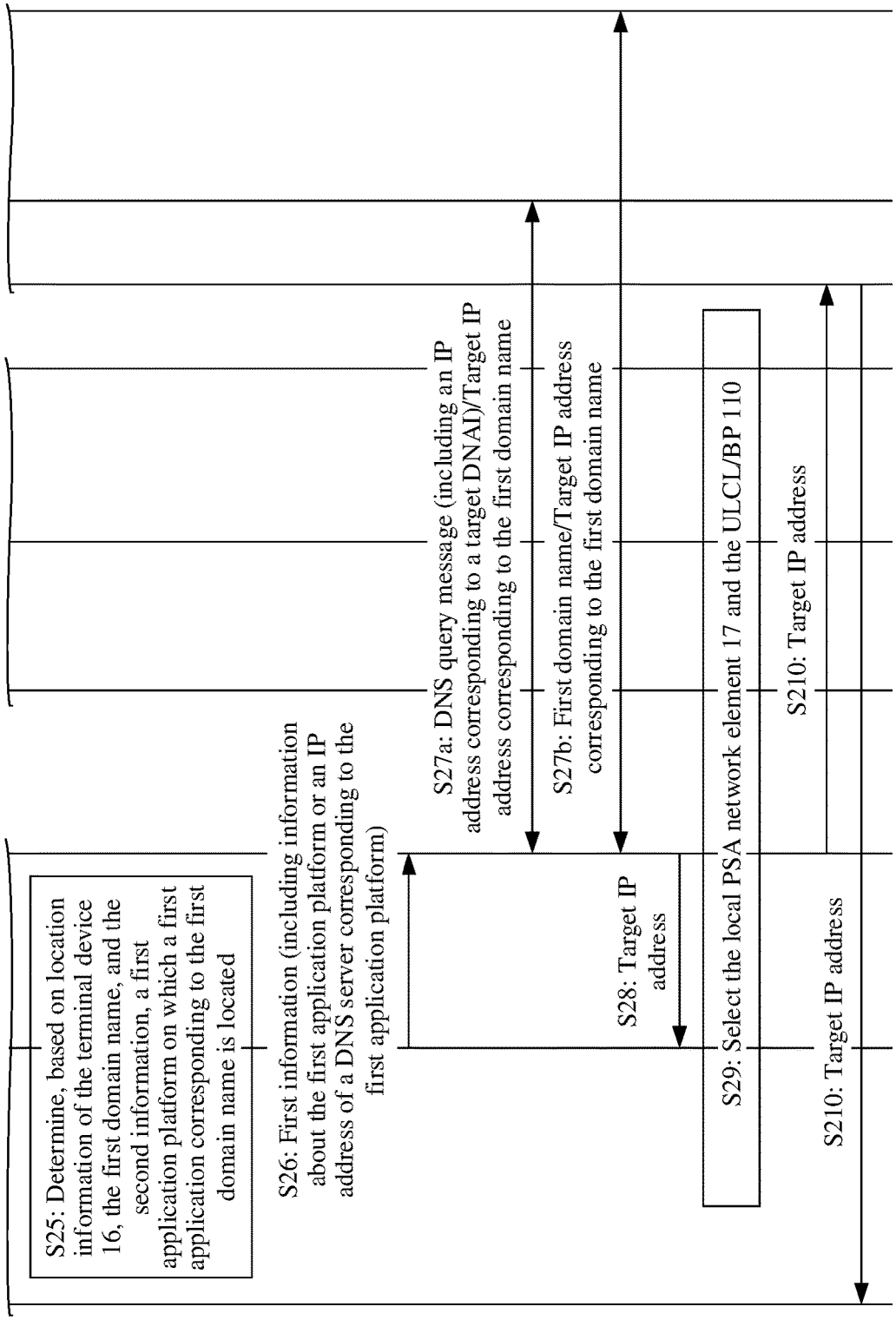

FIG. 2A and FIG. 2B are a schematic flowchart of an application discovery method according to an embodiment of this application. The application discovery method is applied to the application discovery system 10. The application discovery method shown in FIG. 2A and FIG. 2B includes the following steps.

S20: The A-SMF network element 11 obtains application information. The application information includes a correspondence between deployment location information of an application server (AS) and a domain name of an application. It should be noted that the A-SMF network element 11 may obtain the application information in advance, so that the stored application information is in a usable state.

In an optional implementation, the A-SMF network element 11 may further obtain an IP address of a local DNS server that can resolve domain names of these applications.

In this embodiment of this application, the application discovery system 10 uses a mobile edge computing (MEC) technology to deploy both the AS and some service processing and resource scheduling functions of a mobile broadband (MBB) core network at a network edge close to an access network, to form an MEC platform. Therefore, in this embodiment of this application, the deployment location information of the AS is location information of a local application platform or location information of the MEC platform, for example, may be represented by an identifier of the MEC platform or a data network access identifier (DNAI). The following describes a subsequent application discovery process by using an example in which a representation form of the deployment location information of the AS is the DNAI.

In this embodiment of this application, the local DNS server may be understood as a DNS server located in a local data center. The local DNS server is mainly responsible for resolving a domain name of an application deployed on the local application platform or the MEC platform. For example, one or more applications may be deployed on one MEC platform. In this case, a DNS server serving the MEC platform may be referred to as a local DNS server, and the local DNS server is responsible for resolving a domain name of an application deployed on the MEC platform. In this application, the deployment location information of the AS stored in the A-SMF network element 11 may be understood as the location information of the local application platform or the location information of the MEC platform. In this case, a DNS server responsible for resolving the domain names of these applications is referred to as a local DNS server. In addition, if the deployment location information of the AS stored in the A-SMF network element 11 includes location information of a plurality of local application platforms or a plurality of MEC platforms, there may be a plurality of DNS servers (namely, local servers) responsible for resolving the domain names of these applications.

In another optional implementation, the A-SMF network element 11 may further obtain an IP address corresponding to each MEC platform. An IP address corresponding to one MEC platform is an IP address required on a routing path when a network element device in a network accesses the MEC platform, or an IP address corresponding to one MEC platform is an IP address required on a communication path when a network element device in a network communicates with the MEC platform.

For example, an IP address corresponding to one MEC platform may be a public IP address required for accessing the MEC platform. For example, the public IP address is any public IP address in public IP address space at an entrance of the MEC platform.

For example, an IP address corresponding to one MEC platform may be a subnet IP address or a full IP address required for accessing the MEC platform. For example, the subnet IP address is a subnet or full IP address pointing to the MEC platform after network address translation (NAT) (subnets or full IP addresses after NAT) when a UPF network element accesses the MEC platform through an N6 interface. The N6 interface is a reference point between the UPF network element and a DN. It may be understood that an IP address corresponding to one MEC platform may represent location information of the MEC platform. Therefore, when the A-SMF network element 11 obtains the IP address corresponding to the MEC platform, the A-SMF network element 11 obtains the location information of the MEC platform. The IP address corresponding to the platform means that the IP address corresponding to the MEC platform functions the same as a DNAI, and both can be for identifying the location information of the MEC platform.

Because a DNAI is for uniquely identifying location information of an MEC platform, the IP address corresponding to each MEC platform may also be understood as an IP address corresponding to each DNAI.

In this embodiment of this application, the foregoing information (including the correspondence between deployment location information of an AS and a domain name of an application, the IP address of the local DNS server that can resolve the domain names of these applications, and the IP address corresponding to each MEC platform) obtained by the A-SMF network element 11 may be obtained by the A-SMF network element 11 from locally configured information, or may be obtained by the A-SMF network element 11 from the PCF network element 13. A specific manner of obtaining the foregoing information by the A-SMF network element 11 is not limited in this application.

It should be noted that, when the AS is deployed in the application discovery system 10, the A-SMF network element 11 may obtain the correspondence between deployment location information of an AS and a domain name of an application, the IP address of the local DNS server that can resolve the domain names of these applications, and the IP address corresponding to each MEC platform. Each time a new AS is deployed in the application discovery system 10, the A-SMF network element 11 may obtain related information (including a correspondence between deployment location information of the new AS and a domain name of an application, an IP address of a local DNS server that can resolve domain names of these applications, and an IP address corresponding to a new MEC platform) of the new AS in a timely manner.

S21: The A-SMF network element 11 determines second information based on the obtained application information, and sends the second information to the I-SMF network element 12.

S21a: The I-SMF network element 12 sends, to the A-SMF network element 11, a location information list corresponding to the I-SMF network element 12, where the location information list includes location information of at least one MEC platform corresponding to the I-SMF network element 12.

Specifically, the location information list may include a DNAI list. It should be noted that the location information list corresponding to the I-SMF network element 12 may also be understood as a DNAI list served by the I-SMF network element 12 or a DNAI list supported by the I-SMF network element 12 (DNAI list supported by I-SMF). The DNAI list corresponding to the I-SMF network element 12 includes at least one DNAI corresponding to the I-SMF network element 12.

In an optional implementation, that the I-SMF network element 12 sends, to the A-SMF network element 11, a location information list corresponding to the I-SMF network element 12 may specifically include: The I-SMF network element 12 sends a PDU session creation request (for example, the PDU session creation request may be an Nsmf_PDUSession_Create request service-oriented invocation message) to the A-SMF network element 11, where the PDU session creation request carries the location information list corresponding to the I-SMF network element 12.

In this embodiment of this application, if a location of an MEC platform is in a service area managed by the I-SMF network element 12, it may be understood that the MEC platform is an MEC platform corresponding to the I-SMF network element 12. Further, a DNAI corresponding to the MEC platform is a DNAI corresponding to the I-SMF network element 12. When there are a plurality of MEC platforms in the service area managed by the I-SMF network element 12, a DNAI list including a plurality of DNAIs corresponding to the plurality of MEC platforms is the DNAI list corresponding to the I-SMF network element 12.

S21b: When receiving the location information list corresponding to the I-SMF network element 12, the A-SMF network element 11 determines the second information based on the obtained application information, and sends the second information to the I-SMF network element 12.

Specifically, when receiving the location information list corresponding to the I-SMF network element 12, the A-SMF network element 11 may determine, based on the obtained application information (including a correspondence between a DNAI and a domain name of an application), a domain name corresponding to the at least one DNAI in the location information list. The domain name corresponding to the at least one DNAI in the location information list may also be understood as a domain name of at least one application corresponding to the I-SMF network element 12.

Further, the A-SMF network element 11 may determine, based on the obtained application information, a DNAI corresponding to the domain name of the at least one application. The DNAI corresponding to the domain name of the at least one application may also be understood as a DNAI corresponding to an AS (or MEC platform) on which the at least one application is located.

Further, the A-SMF network element 11 may determine, as the second information, the domain name of the at least one application corresponding to the I-SMF network element 12 and the DNAI corresponding to the AS (or MEC platform) on which the at least one application is located. The second information may be understood as application information corresponding to the I-SMF network element 12.

In this embodiment of this application, the domain name of the application may be a fully qualified domain name (FQDN) or a domain name in another form. This is not limited in this application. The following describes a subsequent application discovery process by using an example in which a representation form of the domain name is the FQDN.

For example, the application information obtained by the A-SMF network element 11 is shown in Table 1. When the DNAI list corresponding to the I-SMF network element 12 includes a DNAI-3 and a DNAI-4, the A-SMF network element 11 uses a domain name of an application-2 and deployment location information as the application information corresponding to the I-SMF network element 12, and sends the application information to the I-SMF network element 12. Specifically, the A-SMF network element 11 may send the application information shown in Table 2 to the I-SMF network element 12.

TABLE 1

Application information obtained by the A-SMF network element 11

| Application name | Domain name of an application | Deployment location information of an application server |
|---|---|---|
| Application-1 | FQDN-A | DNAI-1 |
|  |  | DNAI-2 |
| Application-2 | FQDN-B | DNAI-3 |
|  |  | DNAI-4 |
|  |  | DNAI-5 |

TABLE 2

Application information corresponding to the I-SMF network element 12

| Application name | Domain name of an application | Deployment location information of an application server |
|---|---|---|
| Application-2 | FQDN-B | DNAI-3 |
|  |  | DNAI-4 |
|  |  | DNAI-5 |

S22: The A-SMF network element 11 sends, to the remote PSA network element 14, the domain name of the at least one application corresponding to the I-SMF network element 12.

In an optional implementation, that the A-SMF network element 11 sends, to the remote PSA network element 14, the domain name of the at least one application corresponding to the I-SMF network element 12 may specifically include: The A-SMF network element 11 sends a forwarding rule to the remote PSA network element 14, where the forwarding rule carries the domain name of the at least one application corresponding to the I-SMF network element 12.

The forwarding rule is a rule that indicates, to the remote PSA network element 14, a way to forward a domain name in a received DNS query message. In other words, the forwarding rule is a rule that indicates the remote PSA network element 14 to forward a specific domain name in the received DNS query message to a specific A-SMF network element. Specifically, the forwarding rule may indicate the remote PSA network element 14 to perform packet detection on the DNS query message when receiving the DNS query message of the terminal device 16. If detecting that a domain name of at least one application corresponding to an I-SMF network element includes the domain name in the DNS query message, the remote PSA network element 14 forwards the domain name to an A-SMF network element that manages the I-SMF network element. For example, if detecting that the domain name of the at least one application corresponding to the I-SMF network element 12 includes the domain name in the DNS query message, the remote PSA network element 14 may forward the domain name to the A-SMF network element 11.

S23: The A-SMF network element 11 obtains a first domain name requested by the terminal device 16.

S23a: The terminal device 16 sends the DNS query message to a core network through an access network device based on a service requirement of the terminal device 16, to initiate a DNS query on a first application. The DNS query message includes the first domain name corresponding to the first application.

Specifically, the terminal device 16 sends the DNS query message to the remote PSA network element 14.

Optionally, the DNS query message may further include a destination address, and the destination address is an IP address of the remote DNS server 19. The remote DNS server 19 may be a centralized DNS server deployed by an operator. In a session establishment process, the A-SMF network element 11 may send the IP address of the remote DNS server 19 to the terminal device 16.

S23b: When receiving the DNS query message, the remote PSA network element 14 forwards the first domain name to the A-SMF network element 11.

Specifically, when receiving the DNS query message, the remote PSA network element 14 detects whether the domain name of the at least one application corresponding to the I-SMF network element 12 includes the first domain name. If the domain name of the at least one application corresponding to the I-SMF network element 12 includes the first domain name, the remote PSA network element 14 forwards the first domain name to the A-SMF network element 11.

For example, the remote PSA network element 14 may forward the DNS query message including the first domain name to the A-SMF network element 11.

S24: The A-SMF network element 11 sends the first domain name to the I-SMF network element 12.

Specifically, when receiving the first domain name, the A-SMF network element 11 determines, based on the first domain name and an obtained correspondence between a DNAI and an FQDN, at least one DNAI corresponding to the first domain name. The at least one DNAI corresponding to the first domain name is at least one DNAI corresponding to at least one AS (or MEC platform) on which the first application corresponding to the first domain name is located. If the DNAI list corresponding to the I-SMF network element 12 includes one or more DNAIs in the at least one DNAI corresponding to the first domain name, the A-SMF network element 11 may send the first domain name to the I-SMF network element 12.

In an optional implementation, that the A-SMF network element 11 sends the first domain name to the I-SMF network element 12 may specifically include: The A-SMF network element 11 sends a routing request to the I-SMF network element 12, where the routing request includes the first domain name.

S25: When receiving the first domain name, the I-SMF network element 12 determines a first application platform on which the first application corresponding to the first domain name is located.

In an optional implementation, that the I-SMF network element 12 determines a first application platform on which the first application corresponding to the first domain name is located may specifically include: The I-SMF network element 12 determines a target DNAI corresponding to the first domain name, and determines an MEC platform corresponding to the target DNAI as the first application platform on which the first application corresponding to the first domain name is located.

In this embodiment of this application, the target DNAI is determined by the I-SMF network element 12 based on one or more of current location information of the terminal device 16, the first domain name, the second information obtained by the I-SMF network element 12, network topology information, and network congestion information, so that the MEC platform corresponding to the target DNAI is close to a current location of the terminal device 16, or a network topology between the MEC platform corresponding to the target DNAI and the terminal device 16 is optimized. The MEC platform corresponding to the target DNAI is the first application platform on which the first application corresponding to the first domain name is located. The current location information of the terminal device 16 is obtained by the I-SMF network element 12 from the AMF network element 111, and may be identified by using a tracking area identity (TAI).

Specifically, the I-SMF network element 12 may first determine, based on the first domain name and the second information obtained by the I-SMF network element 12, the at least one DNAI corresponding to the first domain name. The target DNAI is one of the at least one DNAI corresponding to the first domain name.

When the terminal device accesses, through an optimal path, the first application corresponding to the first domain name at the current location, if there are a plurality of MEC platforms on which the first application is located, there are a plurality of first application platforms, in other words, there are a plurality of target DNAIs. When the plurality of target DNAIs meet the foregoing condition, the I-SMF network element 12 may determine a target DNAI list. The following describes a subsequent application discovery process by using an example in which the I-SMF network element 12 determines a single target DNAI.

S26: The I-SMF network element 12 sends first information to the A-SMF network element 11. The first information may include information about the first application platform or an IP address of a DNS server corresponding to the first application platform. The information about the first application platform may include location information of the first application platform or an IP address corresponding to the first application platform.

In an optional implementation, that the I-SMF network element 12 sends first information to the A-SMF network element 11 may specifically include: The I-SMF network element 12 sends, in response to the routing request, a routing response to the A-SMF network element 11, where the routing response includes the first information.

In an optional implementation, the location information of the first application platform may include the target DNAI, the IP address corresponding to the first application platform may include an IP address corresponding to the target DNAI, and the IP address of the DNS server corresponding to the first application platform may include an IP address of a local DNS server corresponding to the target DNAI.

Specifically, in an optional implementation, the I-SMF network element 12 may directly send the target DNAI as the first information to the A-SMF network element 11.

In another optional implementation, the I-SMF network element 12 may determine, based on the target DNAI and a prestored correspondence between a DNAI and an IP address, an IP address corresponding to the target DNAI, and send the IP address corresponding to the target DNAI as the first information to the A-SMF network element 11. The IP address corresponding to the target DNAI is an IP address corresponding to the MEC platform (namely, the first application platform) corresponding to the target DNAI.

In this implementation, the correspondence that is between a DNAI and an IP address and that is prestored in the I-SMF network element 12 may be locally configured on the I-SMF network element 12. Alternatively, the correspondence that is between a DNAI and an IP address and that is prestored in the I-SMF network element 12 may be obtained by the I-SMF network element 12 from the A-SMF network element 11. Specifically, when receiving the location information list corresponding to the I-SMF network element 12, the A-SMF network element 11 may further send, to the I-SMF network element 12, an IP address corresponding to a DNAI corresponding to at least one MEC platform on which each of the at least one application corresponding to the I-SMF network element 12 is located.

In still another optional implementation, the I-SMF network element 12 may determine, based on the target DNAI and a prestored correspondence between a DNAI and an IP address of a local DNS server, an IP address of a local DNS server corresponding to the target DNAI, and send the IP address of the local DNS server corresponding to the target DNAI as the first information to the A-SMF network element 11.

In this implementation, the correspondence that is between a DNAI and an IP address of a local DNS server and that is prestored in the I-SMF network element 12 may be locally configured on the I-SMF network element 12. Alternatively, the correspondence that is between a DNAI and an IP address of a local DNS server and that is prestored in the I-SMF network element 12 may be obtained by the I-SMF network element 12 from the A-SMF network element 11. Specifically, when receiving the location information list, the A-SMF network element 11 may further send, to the I-SMF network element 12, an IP address of a local DNS server corresponding to a DNAI corresponding to at least one MEC platform on which each of the at least one application corresponding to the I-SMF network element 12 is located.

S27: When receiving the first information, the A-SMF network element 11 sends the DNS query message to the local DNS server 18 or the remote DNS server 19.

Optionally, the A-SMF network element 11 may determine, based on a local policy, to send the DNS query message to the local DNS server 18 or the remote DNS server 19. In an implementation of the local policy, the A-SMF network element 11 sends the DNS query message to a DNS server with lighter load based on load statuses of the local DNS server 18 and the remote DNS server 19.

S27a: Specifically, it is assumed that the A-SMF network element 11 determines to send the DNS query message to the remote DNS server 19. In an optional implementation, when the first information includes the target DNAI, the A-SMF network element 11 may determine, based on the target DNAI and the obtained correspondence between a DNAI and an IP address, the IP address corresponding to the target DNAI, use the IP address corresponding to the target DNAI as an ECS option in the DNS query message to update the DNS query message, and send an updated DNS query message to the remote DNS server 19.

In another optional implementation, when the first information includes the IP address corresponding to the target DNAI, the A-SMF network element 11 may use the IP address corresponding to the target DNAI as an ECS option in the DNS query message to update the DNS query message, and send an updated DNS query message to the remote DNS server 19.

Based on existing extension mechanisms for a DNS message (EDNS), the EDNS client subnet (ECS) option may be added to the DNS query message, where the ECS option includes an IP address of a client, so that the DNS server better determines, based on the IP address of the client, an IP address corresponding to a domain name that the client requests to query. In this application, because an IP address of the terminal device cannot reflect the location of the terminal device, the A-SMF network element 11 needs to obtain the IP address corresponding to the target DNAI. The IP address may be added to the DNS query message as the ECS option, so that the DNS server better determines, based on the ECS option, an IP address corresponding to the first domain name that the terminal device requests to query.

When receiving the first domain name, the remote DNS server 19 resolves the first domain name to obtain a target IP address corresponding to the first domain name, and sends the target IP address to the A-SMF network element 11.

In an optional implementation, the remote DNS server 19 may send, in response to the DNS query message, a DNS response to the A-SMF network element 11, where the DNS response includes the target IP address.

S27b: It is assumed that the A-SMF network element 11 determines to send the DNS query message to the local DNS server 18. In an optional implementation, when the first information includes the target DNAI, the A-SMF network element 11 may further determine, based on the target DNAI and the obtained correspondence between a DNAI and an IP address of a local DNS server, the IP address of the local DNS server corresponding to the target DNAI, and send the first domain name to the local DNS server 18 based on the IP address of the local DNS server corresponding to the target DNAI.

In another optional implementation, when the first information includes the IP address of the local DNS server corresponding to the target DNAI, the A-SMF network element 11 may send the first domain name to the local DNS server 18 based on the IP address of the local DNS server corresponding to the target DNAI.

For example, the A-SMF network element 11 may send the DNS query message including the first domain name to the local DNS server 18.

When receiving the first domain name, the local DNS server 18 resolves the first domain name to obtain a target IP address corresponding to the first domain name, and sends the target IP address to the A-SMF network element 11.

In an optional implementation, the local DNS server 18 may send, in response to the DNS query message, a DNS response to the A-SMF network element 11, where the DNS response includes the target IP address.

When receiving the target IP address, the A-SMF network element 11 may separately perform S28 and S210 to send the target IP address to the I-SMF network element 12 and the terminal device 16.

S28: When receiving the target IP address, the A-SMF network element 11 sends the target IP address to the I-SMF network element 12.

For example, the A-SMF network element 11 may send the DNS response including the target IP address to the I-SMF network element 12.

In an optional implementation, when receiving the target IP address, the A-SMF network element 11 may further send a DNAI corresponding to the target IP address to the I-SMF network element 12.

S29: When receiving the target IP address, the I-SMF network element 12 determines, based on the target IP address, whether to select the local PSA network element 17 and the ULCL/BP 110 for the terminal device 16.

Specifically, the I-SMF network element 12 may determine whether the DNAI corresponding to the target IP address indicates the location information of the MEC platform. If the DNAI corresponding to the target IP address indicates the location information of the MEC platform, the I-SMF network element 12 selects the local PSA network element 17 and the ULCL/BP 110 for the terminal device 16, and performs an insertion procedure of the ULCL/BP 110.

Alternatively, the I-SMF network element 12 may determine whether the target IP address belongs to a prestored IP address list. If the target IP address belongs to the prestored IP address list, the I-SMF network element 12 selects the local PSA network element 17 and the ULCL/BP 110, and performs an insertion procedure of the ULCL/BP 110.

If the I-SMF network element 12 chooses to insert the BP, the A-SMF network element 11 needs to allocate a new IPV6 prefix to the terminal device 16, and sends the new IPV6 prefix to the terminal device 16 through the remote PSA network element 14.

S210: When receiving the target IP address, the A-SMF network element 11 further sends the target IP address to the terminal device 16 through the remote PSA network element 14.

For example, the A-SMF network element 11 may send the DNS response including the target IP address to the terminal device 16 through the remote PSA network element 14.

Further, the terminal device 16 may access the first application through the local PSA network element 17 based on the target IP address.

In a scenario in which the I-SMF network element is inserted for a PDU session of the terminal device in the system, when the terminal device needs to access the first application corresponding to the first domain name, in this embodiment of this application, the first application platform on which the first application corresponding to the first domain name is located may be determined through interaction between the A-SMF network element and the I-SMF network element, and the target IP address corresponding to the first domain name is obtained from the DNS server based on related information of the first application platform, so that the terminal device accesses the first application based on the target IP address, to implement application discovery. In addition, if a plurality of application platforms on which the first application corresponding to the first domain name is located are deployed in the application discovery system, the first application platform is determined based on the location information of the terminal device. In this embodiment of this application, the first application platform can be an application platform that is in the plurality of application platforms corresponding to the first domain name and that is close to the terminal device, to reduce a service delay.

Figure 3:
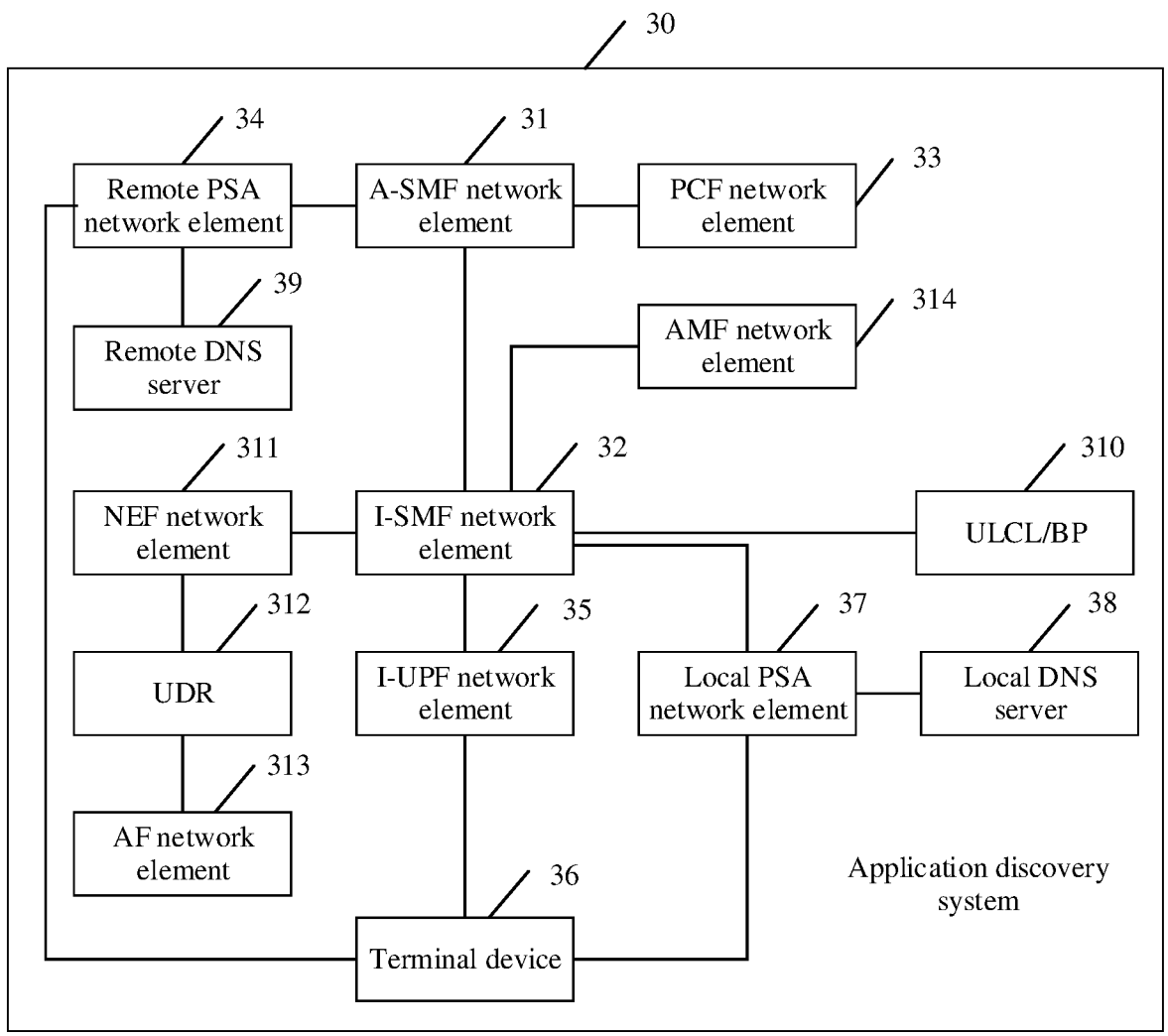
FIG. 3 is a schematic diagram of a framework of another application discovery system according to an embodiment of this application.

FIG. 3 is a schematic diagram of a structure of network elements in another application discovery system according to an embodiment of this application. As shown in FIG. 3, the application discovery system 30 may include an A-SMF network element 31, an I-SMF network element 32, a PCF network element 33, a remote PSA network element 34, an I-UPF network element 35, a terminal device 36, a local PSA network element 37, a local DNS server 38, a remote DNS server 39, a ULCL/BP 310, a network exposure function (NEF) network element 311, a unified data repository (UDR) 312, an AF network element 313, and an AMF network element 314.

The A-SMF network element 31, the I-SMF network element 32, the PCF network element 33, the remote PSA network element 34, the I-UPF network element 35, the local PSA network element 37, the NEF network element 311, the UDR 312, the AF network element 313, and the AMF network element 314 are all core network elements.

Specifically, the A-SMF network element 31 is an anchor SMF network element corresponding to a PDU session established by the terminal device 36 at a first location, and is configured to manage the remote PSA network element 34. The remote PSA network element 34 is an anchor UPF network element (namely, the first anchor UPF network element) corresponding to the PDU session at the first location.

In this embodiment of this application, the PCF network element 33 is configured to store application information, so that the A-SMF network element 31 obtains the application information.

When the terminal device 36 moves from the first location to a second location, an access network element currently corresponding to the PDU session cannot be directly connected to the remote PSA network element 34. In this case, the I-UPF network element 35 and the I-SMF network element 32 are inserted for the PDU session in the application discovery system 30. The I-UPF network element 35 is configured to establish a user plane path between an access network and the remote PSA network element 34, and the I-SMF network element 32 is configured to manage the I-UPF network element 35. The local PSA network element 37 is an anchor UPF network element (namely, the second anchor UPF network element) corresponding to the PDU session at the second location after the terminal device 36 moves from the first location to the second location. The I-SMF network element 32 is further configured to manage the local PSA network element 37.

The UDR 312 is configured to store the application information, so that the PCF network element 33 and the NEF network element 311 obtain the application information.

The AF network element 313 is configured to store the application information, so that the UDR 312 obtains the application information.

Figure 4A:
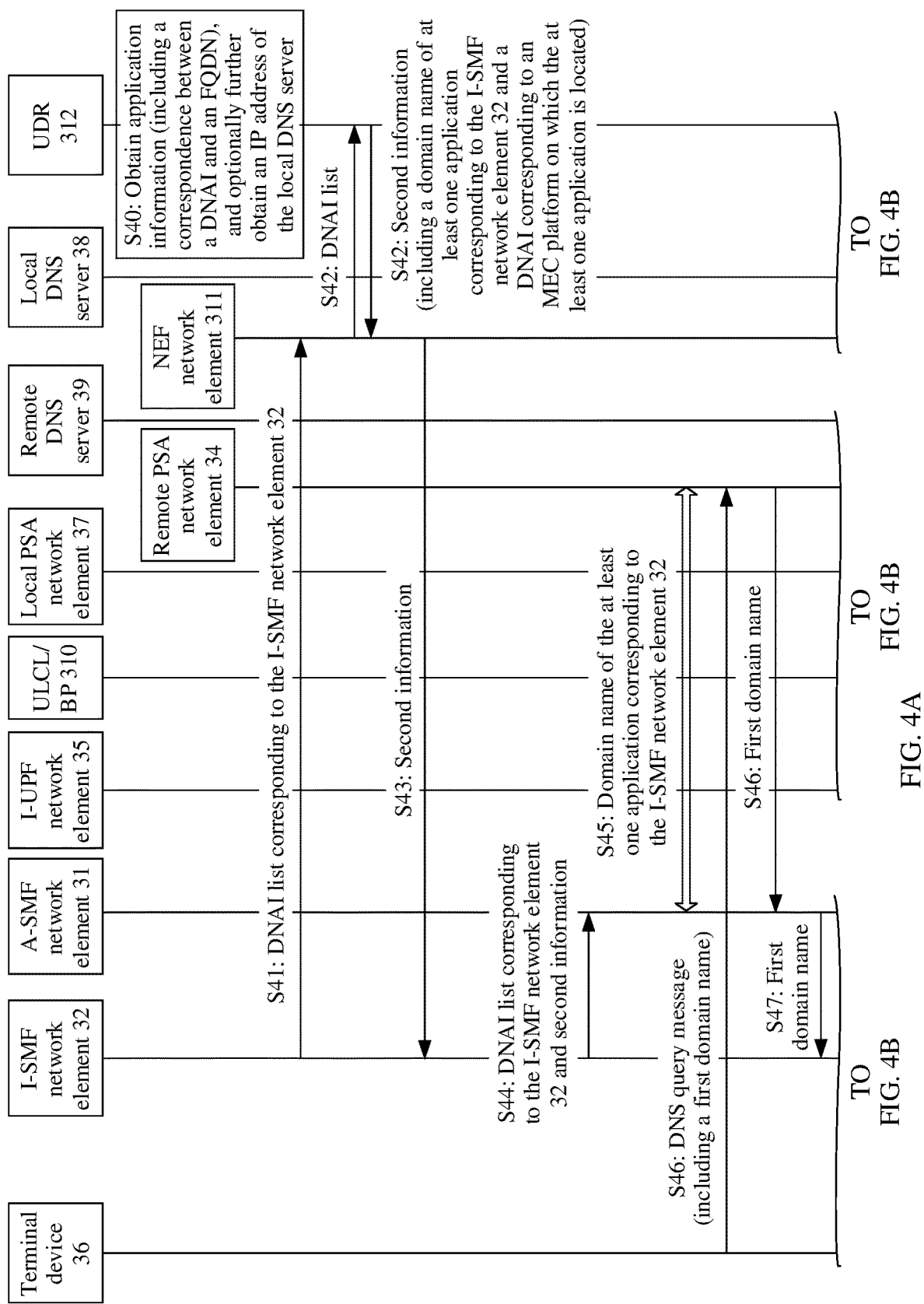
FIG. 4A and FIG. 4B are a schematic flowchart of another application discovery method according to an embodiment of this application.
Figure 4B:
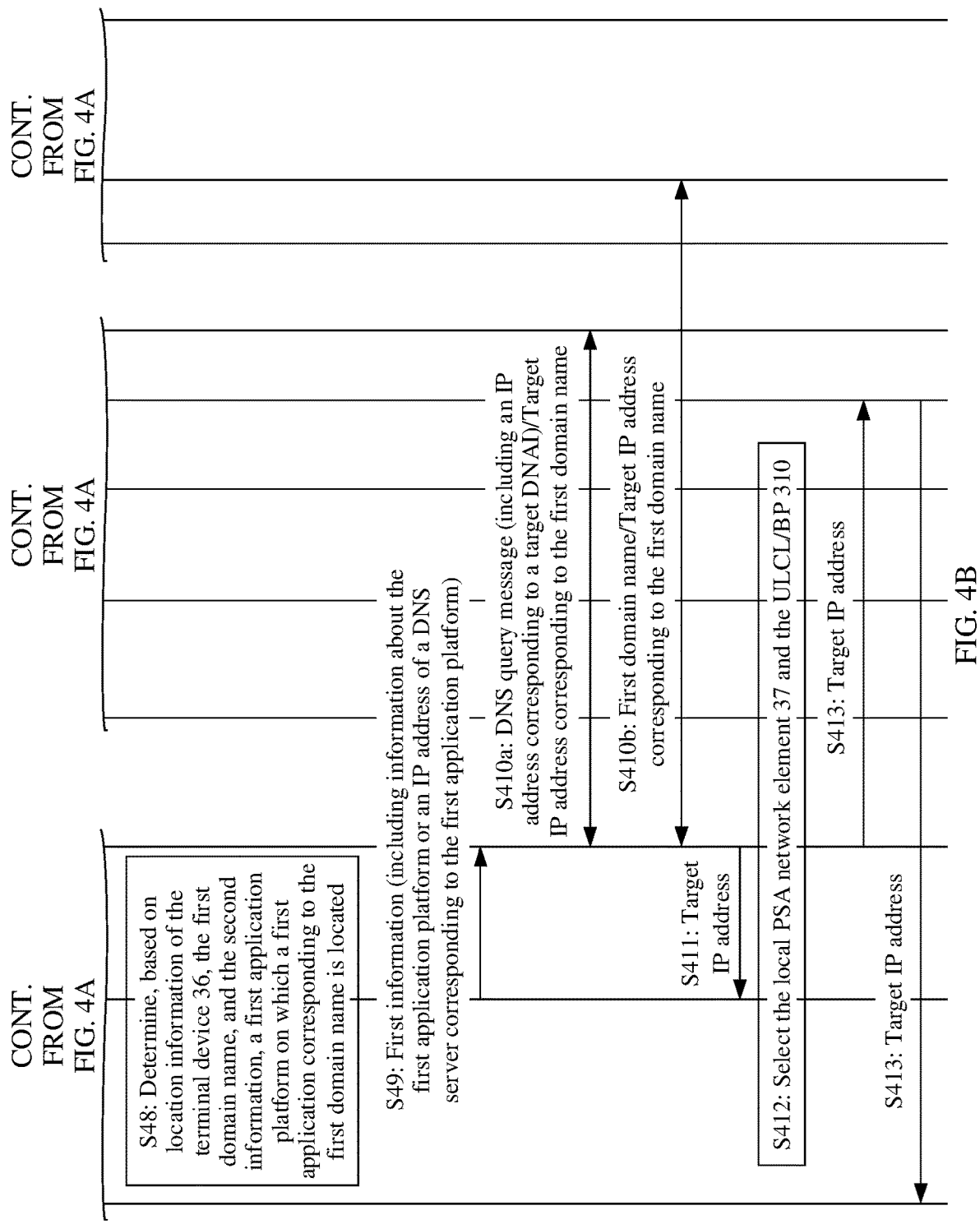

FIG. 4A and FIG. 4B are a schematic flowchart of another application discovery method according to an embodiment of this application. The application discovery method is applied to the application discovery system 30. The application discovery method shown in FIG. 4A and FIG. 4B includes the following steps.

S40: The UDR 312 obtains application information. The application information includes a correspondence between deployment location information of an AS and a domain name of an application.

In this embodiment of this application, the application discovery system 30 uses an MEC technology to deploy both the AS and some service processing and resource scheduling functions of an MBB core network at a network edge close to an access network, to form an MEC platform. Therefore, in this embodiment of this application, the deployment location information of the AS is location information of a local application platform or location information of the MEC platform, for example, may be represented by an identifier of the MEC platform or a DNAI. The following describes a subsequent application discovery process by using an example in which a representation form of the deployment location information of the AS is the DNAI.

In this embodiment of this application, the application information may be obtained by the UDR 312 from locally configured information, or may be obtained by the UDR 312 from the AF network element 313. A specific manner of obtaining the application information by the UDR 312 is not limited in this application.

It should be noted that, when the AS is deployed in the application discovery system 30, the UDR 312 may obtain the correspondence between deployment location information of an AS and a domain name of an application. Each time a new AS is deployed in the application discovery system 30, the UDR 312 may obtain a correspondence between deployment location information of the new AS and a domain name of an application in a timely manner.

S41: The I-SMF network element 32 sends, to the NEF network element 311 through a service-oriented interface, a location information list corresponding to the I-SMF network element 32, where the location information list includes location information of at least one MEC platform corresponding to the I-SMF network element 12.

Specifically, the location information list includes a DNAI list. It should be noted that the location information list corresponding to the I-SMF network element 32 may also be understood as a DNAI list served by the I-SMF network element 32 or a DNAI list supported by the I-SMF network element 32. The DNAI list corresponding to the I-SMF network element 32 includes at least one DNAI corresponding to the I-SMF network element 32.

In this embodiment of this application, if a location of an MEC platform is in a service area managed by the I-SMF network element 32, it may be understood that the MEC platform is an MEC platform corresponding to the I-SMF network element 32. Further, a DNAI corresponding to the MEC platform is a DNAI corresponding to the I-SMF network element 32. When there are a plurality of MEC platforms in the service area managed by the I-SMF network element 32, a DNAI list including a plurality of DNAIs corresponding to the plurality of MEC platforms is the DNAI list corresponding to the I-SMF network element 32.

S42: The NEF network element 311 forwards, to the UDR 312, the DNAI list corresponding to the I-SMF network element 32.

When receiving the DNAI list corresponding to the I-SMF network element 32, the UDR 312 determines second information based on the obtained application information, and sends the second information to the NEF network element 311.

Specifically, when receiving the location information list corresponding to the I-SMF network element 32, the UDR 312 may determine, based on the obtained application information (including a correspondence between a DNAI and a domain name of an application), a domain name corresponding to the at least one DNAI in the location information list. The domain name corresponding to the at least one DNAI in the location information list may also be understood as a domain name of at least one application corresponding to the I-SMF network element 32. Further, the UDR 312 may determine, based on the obtained application information, a DNAI corresponding to the domain name of the at least one application. The DNAI corresponding to the domain name of the at least one application may also be understood as a DNAI corresponding to an AS (or MEC platform) on which the at least one application is located.

Further, the UDR 312 may determine, as the second information, the domain name of the at least one application corresponding to the I-SMF network element 32 and the DNAI corresponding to the AS (or MEC platform) on which the at least one application is located. The second information may be understood as application information corresponding to the I-SMF network element 32.

The domain name of the application may be an FQDN, or may be a domain name in another form. This is not limited in this application. The following describes a subsequent application discovery process by using an example in which a representation form of the domain name is the FQDN.

S43: The NEF network element 311 sends the second information to the I-SMF network element 32.

For example, the application information obtained by the UDR 312 is shown in Table 3. When the DNAI list corresponding to the I-SMF network element 32 includes a DNAI-3 and a DNAI-4, the UDR 312 uses a domain name of an application-2 and deployment location information and a domain name of an application-3 and deployment location information as the application information corresponding to the I-SMF network element 32, and sends the application information to the I-SMF network element 32 through the NEF network element 311. Specifically, the UDR 312 may send the application information shown in Table 4 to the I-SMF network element 32 through the NEF network element 311.

TABLE 3

| Application information obtained by the UDR 312 | | |
| --- | --- | --- |
| Application name | Domain name of an application | Deployment location information of an application server |
| Application-1 | FQDN-A | DNAI-1 |
| | | DNAI-2 |
| Application-2 | FQDN-B | DNAI-3 |
| | | DNAI-4 |
| | | DNAI-5 |
| Application-3 | FQDN-C | DNAI-3 |

TABLE 4

Application information corresponding to the I-SMF network element 32

| Application name | Domain name of an application | Deployment location information of an application server |
|---|---|---|
| Application-2 | FQDN-B | DNAI-3 |
|  |  | DNAI-4 |
|  |  | DNAI-5 |
| Application-3 | FQDN-C | DNAI-3 |

S44: The I-SMF network element 32 sends, to the A-SMF network element 31, the location information list corresponding to the I-SMF network element 32 and the application information corresponding to the I-SMF network element 32.

The application information corresponding to the I-SMF network element 32 includes the domain name of the at least one application corresponding to the I-SMF network element 32 and a DNAI corresponding to at least one AS (or MEC platform) on which each of the at least one application is located.

In an optional implementation, that the I-SMF network element 32 sends, to the A-SMF network element 31, the location information list corresponding to the I-SMF network element 32 and the application information corresponding to the I-SMF network element 32 may specifically include: The I-SMF network element 32 sends a PDU session creation request to the A-SMF network element 31, where the PDU session creation request carries the location information list corresponding to the I-SMF network element 32 and the application information corresponding to the I-SMF network element 32.

S45: When receiving the application information corresponding to the I-SMF network element 32, the A-SMF network element 31 sends, to the remote PSA network element 34, the domain name of the at least one application corresponding to the I-SMF network element 32.

In an optional implementation, that the A-SMF network element 31 sends, to the remote PSA network element 34, the domain name of the at least one application corresponding to the I-SMF network element 32 may specifically include: The A-SMF network element 31 sends a forwarding rule to the remote PSA network element 34, where the forwarding rule carries the domain name of the at least one application corresponding to the I-SMF network element 32.

The forwarding rule is a rule that indicates, to the remote PSA network element 34, a way to forward a domain name in a received DNS query message. In other words, the forwarding rule is a rule that indicates the remote PSA network element 34 to forward the domain name in the received DNS query message to a specific A-SMF network element. Specifically, the forwarding rule may indicate the remote PSA network element 34 to perform packet detection on the DNS query message when receiving the DNS query message of the terminal device 36. If detecting that a domain name of at least one application corresponding to an I-SMF network element includes the domain name in the DNS query message, the remote PSA network element 34 forwards the domain name to an A-SMF network element that manages the I-SMF network element. For example, if detecting that the domain name of the at least one application corresponding to the I-SMF network element 32 includes the domain name in the DNS query message, the remote PSA network element 34 forwards the domain name to the A-SMF network element 31.

S46: The terminal device 36 sends the DNS query message to a core network through an access network device based on a service requirement of the terminal device 36, to initiate a DNS query on a first application. The DNS query message includes a first domain name corresponding to the first application.

Specifically, the terminal device 36 sends the DNS query message to the remote PSA network element 34.

Optionally, the DNS query message may further include a destination address, and the destination address is an IP address of the remote DNS server 39. The remote DNS server 39 may be a centralized DNS server deployed by an operator. In a session establishment process, the A-SMF network element 31 may send the IP address of the remote DNS server 39 to the terminal device 36.

When receiving the DNS query message, the remote PSA network element 34 forwards the first domain name to the A-SMF network element 31.

Specifically, when receiving the DNS query message, the remote PSA network element 34 detects whether the domain name of the at least one application corresponding to the I-SMF network element 32 includes the first domain name. If the domain name of the at least one application corresponding to the I-SMF network element 32 includes the first domain name, the remote PSA network element 34 forwards the first domain name to the A-SMF network element 31.

For example, the remote PSA network element 34 may forward the DNS query message including the first domain name to the A-SMF network element 31.

S47: The A-SMF network element 31 sends the first domain name to the I-SMF network element 32.

Specifically, when receiving the first domain name, the A-SMF network element 31 determines, based on the first domain name and an obtained correspondence between a DNAI and an FQDN, at least one DNAI corresponding to the first domain name. The at least one DNAI corresponding to the first domain name is at least one DNAI corresponding to at least one AS (or MEC platform) on which the first application corresponding to the first domain name is located. If the DNAI list corresponding to the I-SMF network element 32 includes one or more DNAIs in the at least one DNAI corresponding to the first domain name, the A-SMF network element 31 sends the first domain name to the I-SMF network element 32.

In an optional implementation, that the A-SMF network element 11 sends the first domain name to the I-SMF network element 12 may specifically include: The A-SMF network element 11 sends a routing request to the I-SMF network element 12, where the routing request includes the first domain name.

S48: When receiving the first domain name, the I-SMF network element 32 determines a first application platform on which the first application corresponding to the first domain name is located.

In an optional implementation, that the I-SMF network element 32 determines a first application platform on which the first application corresponding to the first domain name is located may specifically include: The I-SMF network element 32 determines a target DNAI corresponding to the first domain name, and determines an MEC platform corresponding to the target DNAI as the first application platform on which the first application corresponding to the first domain name is located.

In this embodiment of this application, the target DNAI is determined by the I-SMF network element 32 based on one or more of current location information of the terminal device 36, the first domain name, the second information obtained by the I-SMF network element 32, network topology information, and network congestion information, so that the MEC platform corresponding to the target DNAI is close to a current location of the terminal device 36, or a network topology between the MEC platform corresponding to the target DNAI and the terminal device 36 is optimized. The MEC platform corresponding to the target DNAI is the first application platform on which the first application corresponding to the first domain name is located. The current location information of the terminal device 36 is obtained by the I-SMF network element 32 from the AMF network element 314, and may be identified by using a TAI.

Specifically, the I-SMF network element 32 may first determine, based on the first domain name and the second information obtained by the I-SMF network element 32, the at least one DNAI corresponding to the first domain name. The target DNAI is one of the at least one DNAI corresponding to the first domain name.

When the terminal device accesses, through an optimal path, the first application corresponding to the first domain name at the current location, if there are a plurality of MEC platforms on which the first application is located, there are a plurality of first application platforms, in other words, there are a plurality of target DNAIs. When the plurality of target DNAIs meet the foregoing condition, the I-SMF network element 32 may determine a target DNAI list. The following describes a subsequent application discovery process by using an example in which the I-SMF network element 32 determines a single target DNAI.

S49: The I-SMF network element 32 sends first information to the A-SMF network element 31. The first information may include information about the first application platform or an IP address of a DNS server corresponding to the first application platform. The information about the first application platform may include location information of the first application platform or an IP address corresponding to the first application platform.

In an optional implementation, that the I-SMF network element 12 sends first information to the A-SMF network element 11 may specifically include: The I-SMF network element 12 sends, in response to the routing request, a routing response to the A-SMF network element 11, where the routing response includes the first information.

In an optional implementation, the location information of the first application platform may include the target DNAI, the IP address corresponding to the first application platform may include an IP address corresponding to the target DNAI, and the IP address of the DNS server corresponding to the first application platform may include an IP address of a local DNS server corresponding to the target DNAI.

Specifically, in an optional implementation, the I-SMF network element 32 may directly send the target DNAI as the first information to the A-SMF network element 31.

In another optional implementation, the I-SMF network element 32 may determine, based on the target DNAI and a prestored correspondence between a DNAI and an IP address, an IP address corresponding to the target DNAI, and send the IP address corresponding to the target DNAI as the first information to the A-SMF network element 31. The IP address corresponding to the target DNAI is an IP address corresponding to the MEC platform (namely, the first application platform) corresponding to the target DNAI.

It should be noted that an IP address corresponding to one MEC platform is an IP address required on a routing path when a network element device in a network accesses the MEC platform, or an IP address corresponding to one MEC platform is an IP address required on a communication path when a network element device in a network communicates with the MEC platform.

For example, an IP address corresponding to one MEC platform may be a public IP address required for accessing the MEC platform. For example, the public IP address is any public IP address in public IP address space at an entrance of the MEC platform.

For example, an IP address corresponding to one MEC platform may be a subnet IP address or a full IP address required for accessing the MEC platform. For example, the subnet IP address is a subnet IP address or a full IP address pointing to the MEC platform after NAT when a UPF network element accesses the MEC platform through a N6 interface. It may be understood that an IP address corresponding to one MEC platform may represent location information of the MEC platform. Therefore, when the A-SMF network element 31 obtains the IP address corresponding to the first application platform, the A-SMF network element 31 obtains the location information of the first application platform.

Because a DNAI is for uniquely identifying location information of an MEC platform, an IP address corresponding to each DNAI may also be understood as an IP address corresponding to each MEC platform.

In this implementation, the correspondence that is between a DNAI and an IP address and that is prestored in the I-SMF network element 32 may be locally configured on the I-SMF network element 32. Alternatively, the correspondence that is between a DNAI and an IP address and that is prestored in the I-SMF network element 32 may be obtained by the I-SMF network element 32 from the A-SMF network element 31. Specifically, when receiving the application information corresponding to the I-SMF network element 32, the A-SMF network element 31 may further send, to the I-SMF network element 32, an IP address corresponding to a DNAI corresponding to at least one MEC platform on which each of the at least one application corresponding to the I-SMF network element 32 is located. Alternatively, the correspondence that is between a DNAI and an IP address and that is prestored in the I-SMF network element 32 may be obtained by the I-SMF network element 32 from the UDR 312. Specifically, when receiving the location information list corresponding to the I-SMF network element 32, the UDR 312 may further send, to the I-SMF network element 32 through the NEF network element 311, an IP address corresponding to a DNAI corresponding to at least one MEC platform on which each of the at least one application corresponding to the I-SMF network element 32 is located.

In still another optional implementation, the I-SMF network element 32 may determine, based on the target DNAI and a prestored correspondence between a DNAI and an IP address of a local DNS server, an IP address of a local DNS server corresponding to the target DNAI, and send the IP address of the local DNS server corresponding to the target DNAI as the first information to the A-SMF network element 31.

In this implementation, the correspondence that is between a DNAI and an IP address of a local DNS server and that is prestored in the I-SMF network element 32 may be locally configured on the I-SMF network element 32. Alternatively, the correspondence that is between a DNAI and an IP address of a local DNS server and that is prestored in the I-SMF network element 32 may be obtained by the I-SMF network element 32 from the A-SMF network element 31. Specifically, when receiving the application information corresponding to the I-SMF network element 32, the A-SMF network element 31 may further send, to the I-SMF network element 32, an IP address of a local DNS server corresponding to a DNAI corresponding to at least one MEC platform on which each of the at least one application corresponding to the I-SMF network element 32 is located. Alternatively, the correspondence that is between a DNAI and an IP address of a local DNS server and that is prestored in the I-SMF network element 32 may be obtained by the I-SMF network element 32 from the UDR 312. Specifically, when receiving the location information list corresponding to the I-SMF network element 32, the UDR 312 may further send, to the I-SMF network element 32 through the NEF network element 311, an IP address of a local DNS server corresponding to a DNAI corresponding to at least one MEC platform on which each of the at least one application corresponding to the I-SMF network element 32 is located.

S410: When receiving the first information, the A-SMF network element 31 sends the DNS query message to the local DNS server 38 or the remote DNS server 39.

Optionally, the A-SMF network element 31 may determine, based on a local policy, to send the DNS query message to the local DNS server 38 or the remote DNS server 39. In an implementation of the local policy, the A-SMF network element 31 sends the DNS query message to a DNS server with lighter load based on load statuses of the local DNS server 38 and the remote DNS server 39.

S410a: Specifically, it is assumed that the A-SMF network element 31 determines to send the DNS query message to the remote DNS server 39. In an optional implementation, when the first information includes the target DNAI, the A-SMF network element 31 may determine, based on the target DNAI and the obtained correspondence between a DNAI and an IP address, the IP address corresponding to the target DNAI, use the IP address corresponding to the target DNAI as an ECS option in the DNS query message to update the DNS query message, and send an updated DNS query message to the remote DNS server 39.

In another optional implementation, when the first information includes the IP address corresponding to the target DNAI, the A-SMF network element 31 may use the IP address corresponding to the target DNAI as an ECS option in the DNS query message to update the DNS query message, and send an updated DNS query message to the remote DNS server 39.

Based on existing EDNS, the ECS option may be added to the DNS query message, where the ECS option includes an IP address of a client, so that the DNS server better determines, based on the IP address of the client, an IP address corresponding to a domain name that the client requests to query. In this application, because an IP address of the terminal device cannot reflect the location of the terminal device, the A-SMF network element 31 needs to obtain the IP address corresponding to the target DNAI. The IP address may be added to the DNS query message as the ECS option, so that the DNS server better determines, based on the ECS option, an IP address corresponding to the first domain name that the terminal device requests to query.

When receiving the first domain name, the remote DNS server 39 resolves the first domain name to obtain a target IP address corresponding to the first domain name, and sends the target IP address to the A-SMF network element 31.

In an optional implementation, the remote DNS server 39 may send, in response to the DNS query message, a DNS response to the A-SMF network element 31, where the DNS response includes the target IP address.

S410b: It is assumed that the A-SMF network element 31 determines to send the DNS query message to the local DNS server 38. In an optional implementation, when the first information includes the target DNAI, the A-SMF network element 31 may further determine, based on the target DNAI and the obtained correspondence between a DNAI and an IP address of a local DNS server, the IP address of the local DNS server corresponding to the target DNAI, and send the first domain name to the local DNS server 38 based on the IP address of the local DNS server corresponding to the target DNAI.

In another optional implementation, when the first information includes the IP address of the local DNS server corresponding to the target DNAI, the A-SMF network element 31 may send the first domain name to the local DNS server 38 based on the IP address of the local DNS server corresponding to the target DNAI.

For example, the A-SMF network element 31 may send the DNS query message including the first domain name to the local DNS server 38.

When receiving the first domain name, the local DNS server 38 resolves the first domain name to obtain a target IP address corresponding to the first domain name, and sends the target IP address to the A-SMF network element 31.

In an optional implementation, the local DNS server 18 may send, in response to the DNS query message, a DNS response to the A-SMF network element 11, where the DNS response includes the target IP address.

When receiving the target IP address, the A-SMF network element 31 may separately perform S411 and S413 to send the target IP address to the I-SMF network element 32 and the terminal device 36.

S411: When receiving the target IP address, the A-SMF network element 31 sends the target IP address to the I-SMF network element 32.

For example, the A-SMF network element 31 may send the DNS response including the target IP address to the I-SMF network element 32.

In an optional implementation, when receiving the target IP address, the A-SMF network element 31 may further send a DNAI corresponding to the target IP address to the I-SMF network element 32.

S412: When receiving the target IP address, the I-SMF network element 32 determines, based on the target IP address, whether to select the local PSA network element 37 and the ULCL/BP 310 for the terminal device 36.

Specifically, the I-SMF network element 32 may determine whether the DNAI corresponding to the target IP address indicates the location information of the MEC platform. If the DNAI corresponding to the target IP address indicates the location information of the MEC platform, the I-SMF network element 32 selects the local PSA network element 37 and the ULCL/BP 310 for the terminal device 36, and performs an insertion procedure of the ULCL/BP 310.

Alternatively, the I-SMF network element 32 may determine whether the target IP address belongs to a prestored IP address list. If the target IP address belongs to the prestored IP address list, the I-SMF network element 32 selects the local PSA network element 37 and the ULCL/BP 310, and performs an insertion procedure of the ULCL/BP 310.

If the I-SMF network element 32 chooses to insert the BP, the A-SMF network element 31 needs to allocate a new IPV6 prefix to the terminal device 36, and sends the new IPV6 prefix to the terminal device 36 through the remote PSA network element 34.

S413: When receiving the target IP address, the A-SMF network element 31 further sends the target IP address to the terminal device 36 through the remote PSA network element 34.

For example, the A-SMF network element 31 may send the DNS response including the target IP address to the terminal device 36 through the remote PSA network element 34.

Further, the terminal device 36 may access the first application through the local PSA network element 37 based on the target IP address.

In a scenario in which the I-SMF network element is inserted for a PDU session of the terminal device in the system, when the terminal device needs to access the first application corresponding to the first domain name, in this embodiment of this application, the first application platform on which the first application corresponding to the first domain name is located may be determined through interaction between the A-SMF network element and the I-SMF network element, and the target IP address corresponding to the first domain name is obtained from the DNS server based on related information of the first application platform, so that the terminal device accesses the first application based on the target IP address. In addition, if a plurality of application platforms on which the first application corresponding to the first domain name is located are deployed in the application discovery system, the first application platform is determined based on the location information of the terminal device. In this embodiment of this application, the first application platform can be an application platform that is in the plurality of application platforms corresponding to the first domain name and that is close to the terminal device, to reduce a service delay.

Figure 5A:
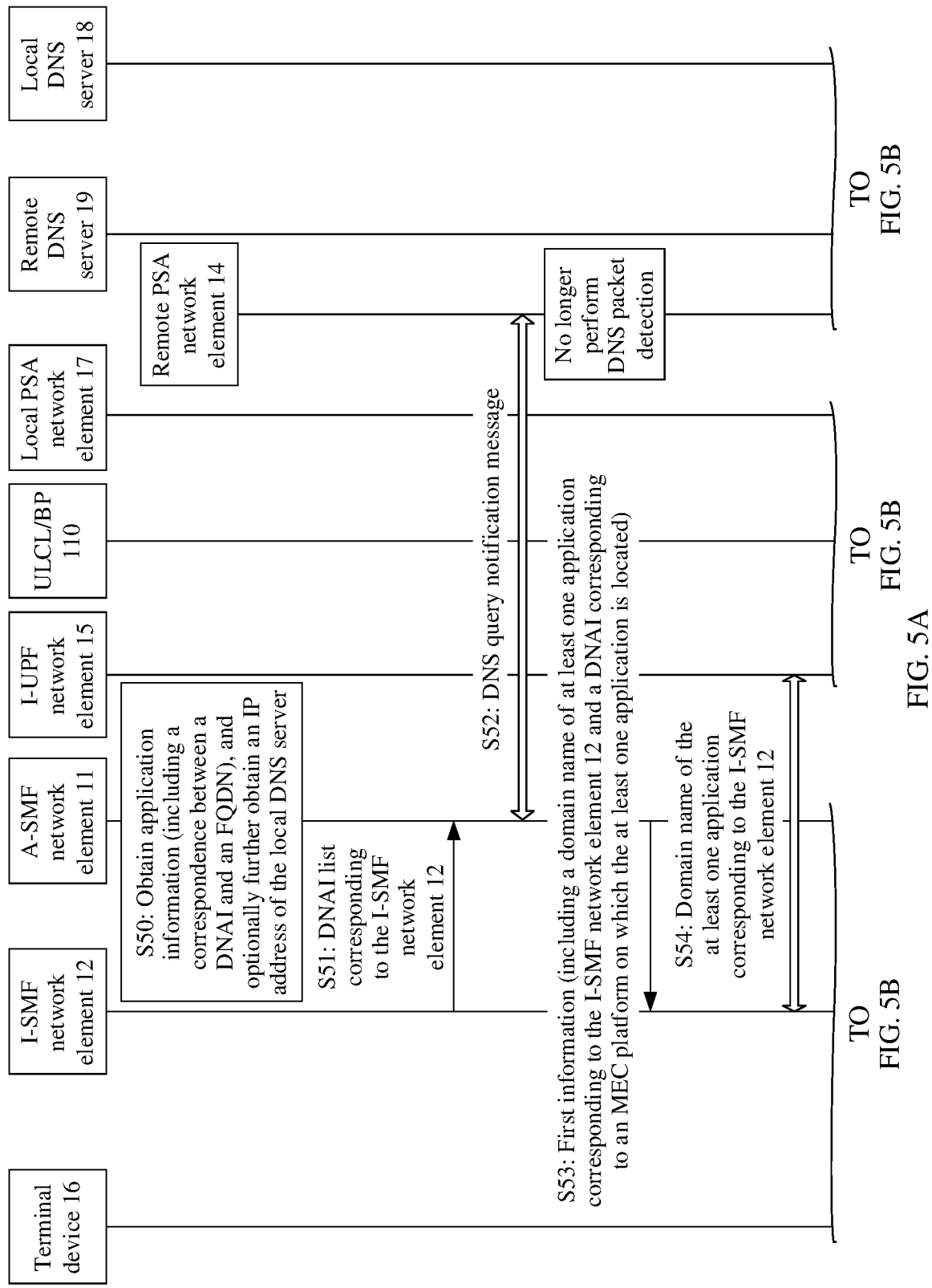
FIG. 5A and FIG. 5B are a schematic flowchart of another application discovery method according to an embodiment of this application.
Figure 5B:
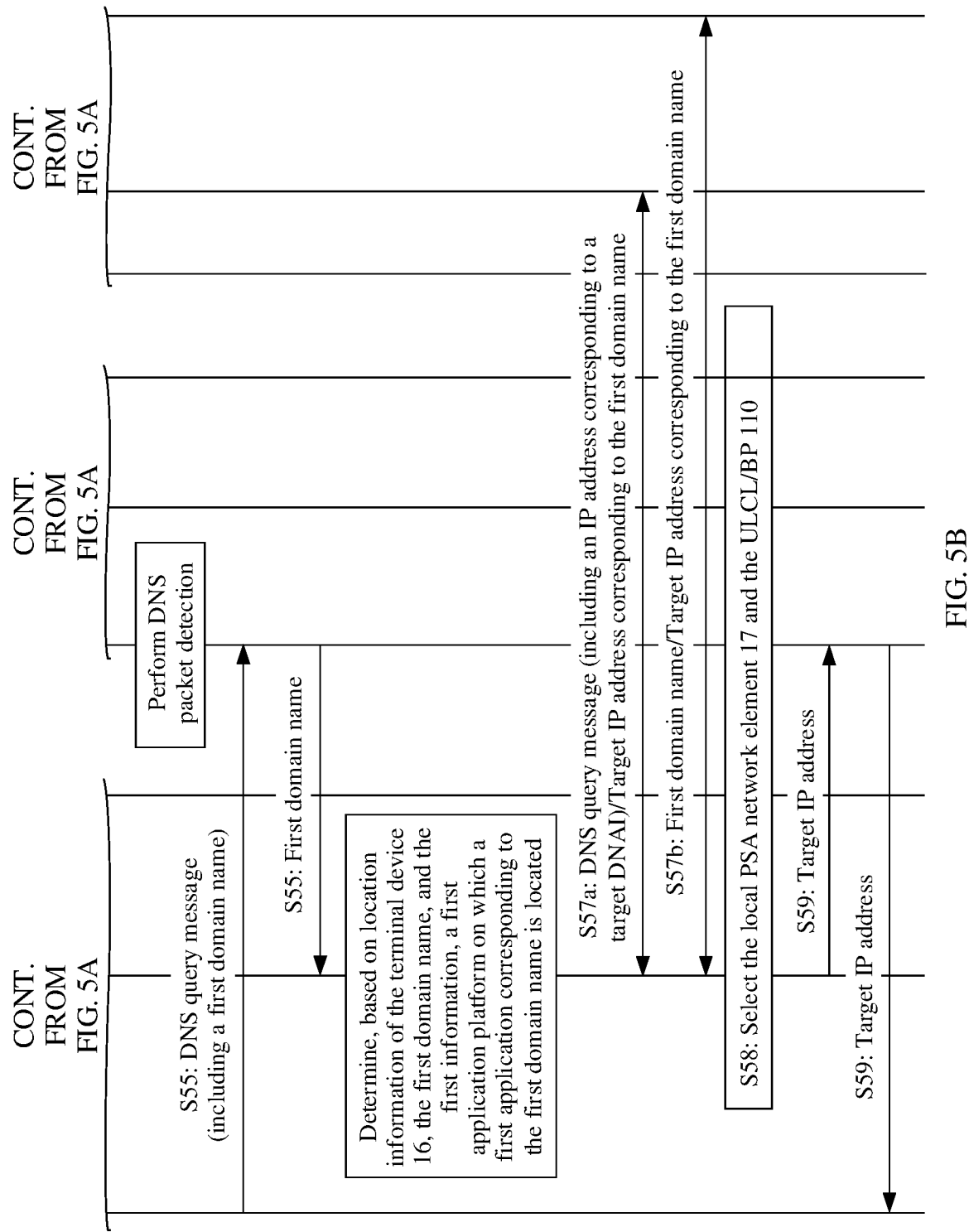

Refer to FIG. 1, FIG. 5A, and FIG. 5B. FIG. 5A and FIG. 5B are a schematic flowchart of still another application discovery method according to an embodiment of this application. The application discovery method is applied to the application discovery system 10. The application discovery method shown in FIG. 5A and FIG. 5B includes the following steps.

S50: The A-SMF network element 11 obtains application information, where the application information includes a correspondence between deployment location information of an AS and a domain name of an application. The deployment location information of the AS is location information of a local application platform or location information of an MEC platform, for example, may be represented by an identifier of the MEC platform or a DNAI. The following describes a subsequent application discovery process by using an example in which a representation form of the deployment location information of the AS is the DNAI.

In an optional implementation, the A-SMF network element 11 may further obtain an IP address of a local DNS server that can resolve domain names of these applications.

In another optional implementation, the A-SMF network element 11 may further obtain an IP address corresponding to each MEC platform.

Because a DNAI is for uniquely identifying location information of an MEC platform, the IP address corresponding to each MEC platform may also be understood as an IP address corresponding to each DNAI.

In this embodiment of this application, the foregoing information (including the correspondence between deployment location information of an AS and a domain name of an application, the IP address of the local DNS server that can resolve the domain names of these applications, and the IP address corresponding to each MEC platform) obtained by the A-SMF network element 11 may be obtained by the A-SMF network element 11 from locally configured information, or may be obtained by the A-SMF network element 11 from the PCF network element 13. A specific manner of obtaining the foregoing information by the A-SMF network element 11 is not limited in this application.

It should be noted that, when the AS is deployed in the application discovery system 10, the A-SMF network element 11 may obtain the correspondence between deployment location information of an AS and a domain name of an application, the IP address of the local DNS server that can resolve the domain names of these applications, and the IP address corresponding to each MEC platform. Each time a new AS is deployed in the application discovery system 10, the A-SMF network element 11 may obtain related information (including a correspondence between deployment location information of the new AS and a domain name of an application, an IP address of a local DNS server that can resolve domain names of these applications, and an IP address corresponding to a new MEC platform) of the new AS in a timely manner.

S51: The I-SMF network element 12 sends, to the A-SMF network element 11, a location information list corresponding to the I-SMF network element 12, where the location information list includes location information of at least one MEC platform corresponding to the I-SMF network element 12.

Specifically, the location information list includes a DNAI list. It should be noted that the location information list corresponding to the I-SMF network element 12 may also be understood as a DNAI list served by the I-SMF network element 12 or a DNAI list supported by the I-SMF network element 12. The DNAI list corresponding to the I-SMF network element 12 includes at least one DNAI corresponding to the I-SMF network element 12.

In an optional implementation, that the I-SMF network element 12 sends, to the A-SMF network element 11, a location information list corresponding to the I-SMF network element 12 may specifically include: The I-SMF network element 12 sends a PDU session creation request to the A-SMF network element 11, where the PDU session creation request carries the location information list corresponding to the I-SMF network element 12.

S52: The A-SMF network element 11 sends a DNS query notification message to the remote PSA network element 14, where the DNS query notification message indicates that the remote PSA network element 14 does not need to perform packet detection on a DNS query message of the terminal device 16.

S53: When receiving the location information list corresponding to the I-SMF network element 12, the A-SMF network element 11 determines first information based on the obtained application information, and sends the first information to the I-SMF network element 12.

Specifically, when receiving the location information list corresponding to the I-SMF network element 12, the A-SMF network element 11 may determine, based on the obtained application information (including a correspondence between a DNAI and a domain name of an application), a domain name corresponding to the at least one DNAI in the location information list. The domain name corresponding to the at least one DNAI in the location information list may also be understood as a domain name of at least one application corresponding to the I-SMF network element 12. Further, the A-SMF network element 11 may determine, based on the obtained application information, a DNAI corresponding to the domain name of the at least one application. The DNAI corresponding to the domain name of the at least one application may also be understood as a DNAI corresponding to an AS (or MEC platform) on which the at least one application is located.

Further, the A-SMF network element 11 may determine, as second information, the domain name of the at least one application corresponding to the I-SMF network element 12 and the DNAI corresponding to the AS (or MEC platform) on which the at least one application is located. The first information may be understood as application information corresponding to the I-SMF network element 12.

S54: The I-SMF network element 12 selects the I-UPF network element 15, and sends, to the I-UPF network element 15, the domain name of the at least one application corresponding to the I-SMF network element 12.

In an optional implementation, that the I-SMF network element 12 sends, to the I-UPF network element 15, the domain name of the at least one application corresponding to the I-SMF network element 12 may specifically include: The I-SMF network element 12 sends a forwarding rule to the I-UPF network element 15, where the forwarding rule carries the domain name of the at least one application corresponding to the I-SMF network element 12.

The forwarding rule is a rule that indicates, to the I-UPF network element 15, a way to forward a domain name in the received DNS query message. In other words, the forwarding rule is a rule that indicates the I-UPF network element 15 to forward the domain name in the received DNS query message to a specific I-SMF network element. Specifically, the forwarding rule may indicate the I-UPF network element 15 to perform packet detection on the DNS query message when receiving the DNS query message of the terminal device 16. If detecting that a domain name of at least one application corresponding to an I-SMF network element includes the domain name in the DNS query message, the I-UPF network element 15 forwards the domain name to the I-SMF network element. For example, if detecting that the domain name of the at least one application corresponding to the I-SMF network element 12 includes the domain name in the DNS query message, the I-UPF network element 15 may forward the domain name to the I-SMF network element 12.

S55: The terminal device 16 sends the DNS query message to a core network through an access network device based on a service requirement of the terminal device 16, to initiate a DNS query on a first application. The DNS query message includes a first domain name corresponding to the first application.

Specifically, the terminal device 16 sends the DNS query message to the I-UPF network element 15.

Optionally, the DNS query message may further include a destination address, and the destination address is an IP address of the remote DNS server 19. The remote DNS server 19 may be a centralized DNS server deployed by an operator. In a session establishment process, the A-SMF network element 11 may send the IP address of the remote DNS server 19 to the terminal device 16.

When receiving the DNS query message, the I-UPF network element 15 forwards the first domain name to the I-SMF network element 12.

Specifically, when receiving the DNS query message, the I-UPF network element 15 detects whether the domain name of the at least one application corresponding to the I-SMF network element 12 includes the first domain name. If the domain name of the at least one application corresponding to the I-SMF network element 12 includes the first domain name, the I-UPF network element 15 forwards the first domain name to the I-SMF network element 12.

For example, the I-UPF network element 15 may forward the DNS query message including the first domain name to the I-SMF network element 12.

S56: When receiving the first domain name, the I-SMF network element 12 determines a first application platform on which the first application corresponding to the first domain name is located.

In an optional implementation, that the I-SMF network element 12 determines a first application platform on which the first application corresponding to the first domain name is located may specifically include: The I-SMF network element 12 determines a target DNAI corresponding to the first domain name, and determines an MEC platform corresponding to the target DNAI as the first application platform on which the first application corresponding to the first domain name is located.

In this embodiment of this application, the target DNAI is determined by the I-SMF network element 12 based on one or more of current location information of the terminal device 16, the first domain name, the first information obtained by the I-SMF network element 12, network topology information, and network congestion information, so that the MEC platform corresponding to the target DNAI is close to a current location of the terminal device 16, or a network topology between the MEC platform corresponding to the target DNAI and the terminal device 16 is optimized. The MEC platform corresponding to the target DNAI is the first application platform on which the first application corresponding to the first domain name is located. The current location information of the terminal device 16 is obtained by the I-SMF network element 12 from the AMF network element 111, and may be identified by using a TAI.

Specifically, the I-SMF network element 12 may first determine, based on the first domain name and the first information obtained by the I-SMF network element 12, at least one DNAI corresponding to the first domain name. The target DNAI is one of the at least one DNAI corresponding to the first domain name.

When the terminal device accesses, through an optimal path, the first application corresponding to the first domain name at the current location, if there are a plurality of MEC platforms on which the first application is located, there are a plurality of first application platforms, in other words, there are a plurality of target DNAIs. When the plurality of target DNAIs meet the foregoing condition, the I-SMF network element 12 may determine a target DNAI list. The following describes a subsequent application discovery process by using an example in which the I-SMF network element 12 determines a single target DNAI.

Further, the I-SMF network element 12 may determine an IP address corresponding to the first application platform or an IP address of a DNS server corresponding to the first application platform. The IP address corresponding to the first application platform may include an IP address corresponding to the target DNAI, and the IP address of the DNS server corresponding to the first application platform may include an IP address of a local DNS server corresponding to the target DNAI.

Specifically, in an optional implementation, the I-SMF network element 12 may determine, based on the target DNAI and a prestored correspondence between a DNAI and an IP address, the IP address corresponding to the target DNAI. The IP address corresponding to the target DNAI is an IP address corresponding to the MEC platform corresponding to the target DNAI.

In this implementation, the correspondence that is between a DNAI and an IP address and that is prestored in the I-SMF network element 12 may be locally configured on the I-SMF network element 12. Alternatively, the correspondence that is between a DNAI and an IP address and that is prestored in the I-SMF network element 12 may be obtained by the I-SMF network element 12 from the A-SMF network element 11. Specifically, when receiving the location information list corresponding to the I-SMF network element 12, the A-SMF network element 11 may further send, to the I-SMF network element 12, an IP address corresponding to a DNAI corresponding to at least one MEC platform on which each of the at least one application corresponding to the I-SMF network element 12 is located.

In another optional implementation, the I-SMF network element 12 may determine, based on the target DNAI and a prestored correspondence between a DNAI and an IP address of a local DNS server, the IP address of the local DNS server corresponding to the target DNAI.

In this implementation, the correspondence that is between a DNAI and an IP address of a local DNS server and that is prestored in the I-SMF network element 12 may be locally configured on the I-SMF network element 12. Alternatively, the correspondence that is between a DNAI and an IP address of a local DNS server and that is prestored in the I-SMF network element 12 may be obtained by the I-SMF network element 12 from the A-SMF network element 11. Specifically, when receiving the location information list corresponding to the I-SMF network element 12, the A-SMF network element 11 may further send, to the I-SMF network element 12, an IP address of a local DNS server corresponding to a DNAI corresponding to at least one MEC platform on which each of the at least one application corresponding to the I-SMF network element 12 is located.

S57: The I-SMF network element 12 sends the DNS query message to the local DNS server 18 or the remote DNS server 19.

Optionally, the I-SMF network element 12 may determine, based on a local policy, to send the DNS query message to the local DNS server 18 or the remote DNS server 19. In an implementation of the local policy, the I-SMF network element 12 sends the DNS query message to a DNS server with lighter load based on load statuses of the local DNS server 18 and the remote DNS server 19.

S57a: It is assumed that the I-SMF network element 12 determines to send the DNS query message to the remote DNS server 19. In an optional implementation, the I-SMF network element 12 may use the IP address corresponding to the target DNAI as an ECS option in the DNS query message to update the DNS query message, and send an updated DNS query message to the remote DNS server 19.

Based on existing EDNS, the ECS option may be added to the DNS query message, where the ECS option includes an IP address of a client, so that the DNS server better determines, based on the IP address of the client, an IP address corresponding to a domain name that the client requests to query. In this application, because an IP address of the terminal device cannot reflect the location of the terminal device, the A-SMF network element 11 needs to obtain the IP address corresponding to the target DNAI. The IP address may be added to the DNS query message as the ECS option, so that the DNS server better determines, based on the ECS option, an IP address corresponding to the first domain name that the terminal device requests to query.

When receiving the first domain name, the remote DNS server 19 resolves the first domain name to obtain a target IP address corresponding to the first domain name, and sends the target IP address to the I-SMF network element 12.

In an optional implementation, the remote DNS server 19 may send, in response to the DNS query message, a DNS response to the I-SMF network element 12, where the DNS response includes the target IP address.

S57b: It is assumed that the I-SMF network element 12 determines to send the DNS query message to the local DNS server 18. In an optional implementation, the I-SMF network element 12 may send the first domain name to the local DNS server 18 based on the IP address of the local DNS server corresponding to the target DNAI.

For example, the I-SMF network element 12 may send the DNS query message including the first domain name to the local DNS server 18.

When receiving the first domain name, the local DNS server 18 resolves the first domain name to obtain a target IP address corresponding to the first domain name, and sends the target IP address to the I-SMF network element 12.

In an optional implementation, the local DNS server 18 may send, in response to the DNS query message, a DNS response to the I-SMF network element 12, where the DNS response includes the target IP address.

When receiving the target IP address, the I-SMF network element 12 may separately perform S58 and S59.

S58: When receiving the target IP address, the I-SMF network element 12 determines, based on the target IP address, whether to select the local PSA network element 17 and the ULCL/BP 110 for the terminal device 16.

Specifically, the I-SMF network element 12 may determine whether a DNAI corresponding to the target IP address indicates the location information of the MEC platform. If the DNAI corresponding to the target IP address indicates the location information of the MEC platform, the I-SMF network element 12 selects the local PSA network element 17 and the ULCL/BP 110 for the terminal device 16, and performs an insertion procedure of the ULCL/BP 110.

Alternatively, the I-SMF network element 12 may determine whether the target IP address belongs to a prestored IP address list. If the target IP address belongs to the prestored IP address list, the I-SMF network element 12 selects the local PSA network element 17 and the ULCL/BP 110, and performs an insertion procedure of the ULCL/BP 110.

If the I-SMF network element 12 chooses to insert the BP, the A-SMF network element 11 needs to allocate a new IPv6 prefix to the terminal device 16, and sends the new IPV6 prefix to the terminal device 16 through the remote PSA network element 14.

S59: When receiving the target IP address, the I-SMF network element 12 further sends the target IP address to the terminal device 16 through the I-UPF network element 15.

For example, the I-SMF network element 12 may send the DNS response including the target IP address to the terminal device 16 through the I-UPF network element 15.

Further, the terminal device 16 may access, through the local PSA network element 17 based on the target IP address, the first application corresponding to the first domain name.

In a scenario in which the I-SMF network element is inserted for a PDU session of the terminal device in the system, when the terminal device needs to access the first application corresponding to the first domain name, the I-SMF network element may obtain the application information of the I-SMF network element from the A-SMF network element, to determine the first application platform on which the first application corresponding to the first domain name is located, and obtains, from the DNS server based on related information of the first application platform, the target IP address corresponding to the first domain name, so that the terminal device accesses the first application based on the target IP address, to implement application discovery. In addition, if a plurality of application platforms on which the first application corresponding to the first domain name is located are deployed in the application discovery system, the first application platform is determined based on the location information of the terminal device. In this embodiment of this application, the first application platform can be an application platform that is in the plurality of application platforms corresponding to the first domain name and that is close to the terminal device, to reduce a service delay.

Figure 6A:
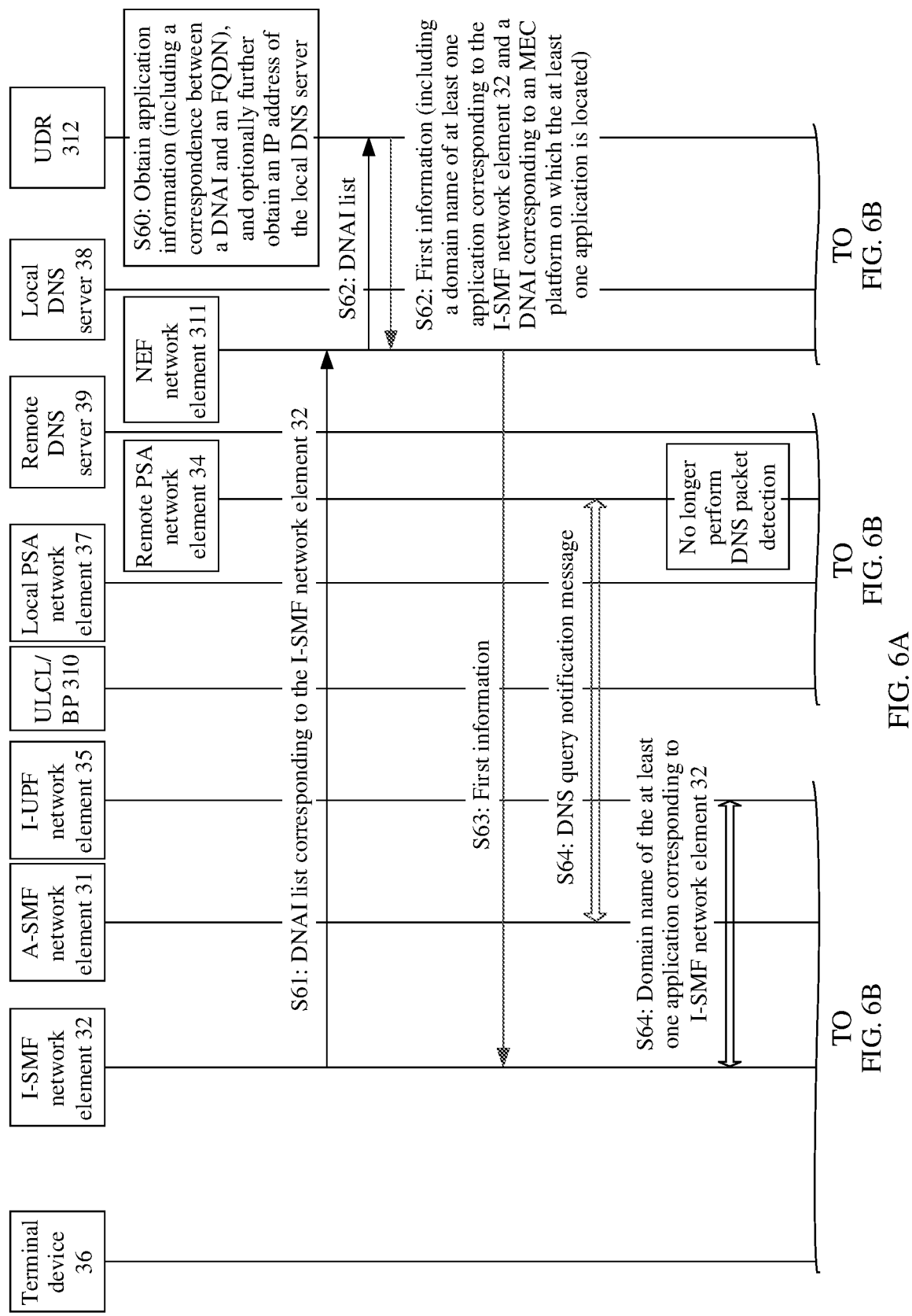
FIG. 6A and FIG. 6B are a schematic flowchart of another application discovery method according to an embodiment of this application.
Figure 6B:
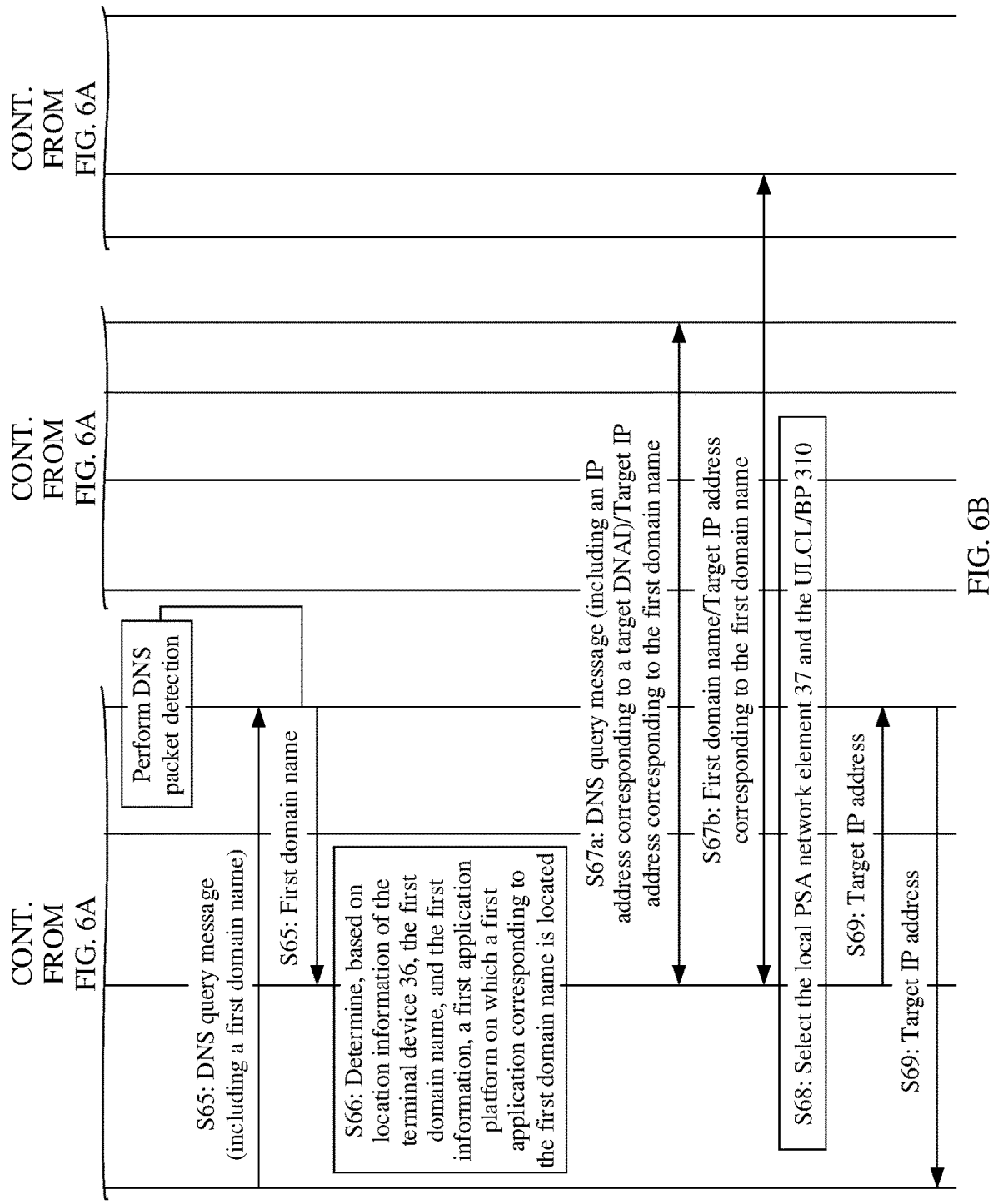

Refer to FIG. 3, FIG. 6A, and FIG. 6B. FIG. 6A and FIG. 6B are a schematic flowchart of another application discovery method according to an embodiment of this application. The application discovery method is applied to the application discovery system 30. The application discovery method shown in FIG. 6A and FIG. 6B includes the following steps.

S60: The UDR 312 obtains application information, where the application information includes a correspondence between deployment location information of an AS and a domain name of an application. The deployment location information of the AS is location information of a local application platform or location information of an MEC platform, for example, may be represented by an identifier of the MEC platform or a DNAI. The following describes a subsequent application discovery process by using an example in which a representation form of the deployment location information of the AS is the DNAI.

In this embodiment of this application, the application information may be obtained by the UDR 312 from locally configured information, or may be obtained by the UDR 312 from the AF network element 313. A specific manner of obtaining the application information by the UDR 312 is not limited in this application.

It should be noted that, when the AS is deployed in the application discovery system 30, the UDR 312 may obtain the correspondence between deployment location information of an AS and a domain name of an application. Each time a new AS is deployed in the application discovery system 30, the UDR 312 may obtain a correspondence between deployment location information of the new AS and a domain name of an application in a timely manner.

S61: The I-SMF network element 32 sends, to the NEF network element 311 through a service-oriented interface, a DNAI list corresponding to the I-SMF network element 31, where the location information list includes location information of at least one MEC platform corresponding to the I-SMF network element 32.

Specifically, the location information list includes a DNAI list. It should be noted that the location information list corresponding to the I-SMF network element 32 may also be understood as a DNAI list served by the I-SMF network element 32 or a DNAI list supported by the I-SMF network element 32. The DNAI list corresponding to the I-SMF network element 32 includes at least one DNAI corresponding to the I-SMF network element 32.

S62: The NEF network element 311 forwards, to the UDR 312, the DNAI list corresponding to the I-SMF network element 32.

When receiving the DNAI list corresponding to the I-SMF network element 32, the UDR 312 determines first information based on the obtained application information, and sends the first information to the NEF network element 311.

Specifically, when receiving the location information list corresponding to the I-SMF network element 32, the UDR 312 may determine, based on the obtained application information (including a correspondence between a DNAI and a domain name of an application), a domain name corresponding to the at least one DNAI in the location information list. The domain name corresponding to the at least one DNAI in the location information list may also be understood as a domain name of at least one application corresponding to the I-SMF network element 32. Further, the UDR 312 may determine, based on the obtained application information, a DNAI corresponding to the domain name of the at least one application. The DNAI corresponding to the domain name of the at least one application may also be understood as a DNAI corresponding to an AS (or MEC platform) on which the at least one application is located.

Further, the UDR 312 may determine, as the first information, the domain name of the at least one application corresponding to the I-SMF network element 32 and the DNAI corresponding to the AS (or MEC platform) on which the at least one application is located. The first information may be understood as application information corresponding to the I-SMF network element 32.

S63: The NEF network element 311 sends the first information to the I-SMF network element 32.

S64: The I-SMF network element 32 selects the I-UPF network element 35, and sends, to the I-UPF network element 35, the domain name of the at least one application corresponding to the I-SMF network element 32.

In an optional implementation, that the I-SMF network element 32 sends, to the I-UPF network element 35, the domain name of the at least one application corresponding to the I-SMF network element 32 may specifically include: The I-SMF network element 32 sends a forwarding rule to the I-UPF network element 35, where the forwarding rule carries the domain name of the at least one application corresponding to the I-SMF network element 32.

The forwarding rule is a rule that indicates, to the I-UPF network element 35, a way to forward a domain name in a received DNS query message. In other words, the forwarding rule is a rule that indicates the I-UPF network element 35 to forward the domain name in the received DNS query message to a specific I-SMF network element. Specifically, the forwarding rule may indicate the I-UPF network element 35 to perform packet detection on the DNS query message when receiving the DNS query message of the terminal device 36. If detecting that a domain name of at least one application corresponding to an I-SMF network element includes the domain name in the DNS query message, the I-UPF network element 35 forwards the domain name to the I-SMF network element. For example, if detecting that the domain name of the at least one application corresponding to the I-SMF network element 32 includes the domain name in the DNS query message, the I-UPF network element 35 may forward the domain name to the I-SMF network element 32.

Optionally, the A-SMF network element 31 sends a DNS query notification message to the remote PSA network element 34, where the DNS query notification message indicates that the remote PSA network element 34 does not need to perform packet detection on the DNS query message of the terminal device 36.

S65: The terminal device 36 sends the DNS query message to a core network through an access network device based on a service requirement of the terminal device 36, to initiate a DNS query on a first application. The DNS query message includes a first domain name corresponding to the first application.

Specifically, the terminal device 36 sends the DNS query message to the I-UPF network element 35.

Optionally, the DNS query message may further include a destination address, and the destination address is an IP address of the remote DNS server 39. The remote DNS server 39 may be a centralized DNS server deployed by an operator.

When receiving the DNS query message, the I-UPF network element 35 forwards the first domain name to the I-SMF network element 32.

Specifically, when receiving the DNS query message, the I-UPF network element 35 detects whether the domain name of the at least one application corresponding to the I-SMF network element 32 includes the first domain name. If the domain name of the at least one application corresponding to the I-SMF network element 32 includes the first domain name, the I-UPF network element 35 forwards the first domain name to the I-SMF network element 32.

For example, the I-UPF network element 35 may forward the DNS query message including the first domain name to the I-SMF network element 32.

S66: When receiving the first domain name, the I-SMF network element 32 determines a first application platform on which the first application corresponding to the first domain name is located.

In an optional implementation, that the I-SMF network element 32 determines a first application platform on which the first application corresponding to the first domain name is located may specifically include: The I-SMF network element 32 determines a target DNAI corresponding to the first domain name, and determines an MEC platform corresponding to the target DNAI as the first application platform on which the first application corresponding to the first domain name is located.

In this embodiment of this application, the target DNAI is determined by the I-SMF network element 32 based on one or more of current location information of the terminal device 36, the first domain name, the first information obtained by the I-SMF network element 32, network topology information, and network congestion information, so that the MEC platform corresponding to the target DNAI is close to a current location of the terminal device 36, or a network topology between the MEC platform corresponding to the target DNAI and the terminal device 36 is optimized. The MEC platform corresponding to the target DNAI is the first application platform on which the first application corresponding to the first domain name is located. The current location information of the terminal device 36 is obtained by the I-SMF network element 32 from the AMF network element 314, and may be identified by using a TAI.

Specifically, the I-SMF network element 32 may first determine, based on the first domain name and the first information obtained by the I-SMF network element 32, at least one DNAI corresponding to the first domain name. The target DNAI is one of the at least one DNAI corresponding to the first domain name.

When the terminal device accesses, through an optimal path, the first application corresponding to the first domain name at the current location, if there are a plurality of MEC platforms on which the first application is located, there are a plurality of first application platforms, in other words, there are a plurality of target DNAIs. When the plurality of target DNAIs meet the foregoing condition, the I-SMF network element 32 may determine a target DNAI list. The following describes a subsequent application discovery process by using an example in which the I-SMF network element 32 determines a single target DNAI.

Further, the I-SMF network element 12 may determine an IP address corresponding to the first application platform or an IP address of a DNS server corresponding to the first application platform. The IP address corresponding to the first application platform may include an IP address corresponding to the target DNAI, and the IP address of the DNS server corresponding to the first application platform may include an IP address of a local DNS server corresponding to the target DNAI.

Specifically, in an optional implementation, the I-SMF network element 32 may determine, based on the target DNAI and a prestored correspondence between a DNAI and an IP address, the IP address corresponding to the target DNAI. The IP address corresponding to the target DNAI is an IP address corresponding to the MEC platform corresponding to the target DNAI.

Because a DNAI is for uniquely identifying location information of an MEC platform, an IP address corresponding to each DNAI may also be understood as an IP address corresponding to each MEC platform.

In this implementation, the correspondence that is between a DNAI and an IP address and that is prestored in the I-SMF network element 32 may be locally configured on the I-SMF network element 32. Alternatively, the correspondence that is between a DNAI and an IP address and that is prestored in the I-SMF network element 32 may be obtained by the I-SMF network element 32 from the A-SMF network element 31. Alternatively, the correspondence that is between a DNAI and an IP address and that is prestored in the I-SMF network element 32 may be obtained by the I-SMF network element 32 from the UDR 312. Specifically, when receiving the location information list corresponding to the I-SMF network element 32, the UDR 312 may further send, to the I-SMF network element 32 through the NEF network element 311, an IP address corresponding to a DNAI corresponding to at least one MEC platform on which each of the at least one application corresponding to the I-SMF network element 32 is located.

In another optional implementation, the I-SMF network element 32 may determine, based on the target DNAI and a prestored correspondence between a DNAI and an IP address of a local DNS server, the IP address of the local DNS server corresponding to the target DNAI.

In this implementation, the correspondence that is between a DNAI and an IP address of a local DNS server and that is prestored in the I-SMF network element 32 may be locally configured on the I-SMF network element 32. Alternatively, the correspondence that is between a DNAI and an IP address of a local DNS server and that is prestored in the I-SMF network element 32 may be obtained by the I-SMF network element 32 from the A-SMF network element 31. Alternatively, the correspondence that is between a DNAI and an IP address of a local DNS server and that is prestored in the I-SMF network element 32 may be obtained by the I-SMF network element 32 from the UDR 312. Specifically, when receiving the location information list corresponding to the I-SMF network element 32, the UDR 312 may further send, to the I-SMF network element 32 through the NEF network element 311, an IP address of a local DNS server corresponding to a DNAI corresponding to at least one MEC platform on which each of the at least one application corresponding to the I-SMF network element 32 is located.

S67: The I-SMF network element 32 sends the DNS query message to the local DNS server 38 or the remote DNS server 39.

Optionally, the I-SMF network element 32 may determine, based on a local policy, to send the DNS query message to the local DNS server 38 or the remote DNS server 39. In an implementation of the local policy, the I-SMF network element 32 sends the DNS query message to a DNS server with lighter load based on load statuses of the local DNS server 38 and the remote DNS server 39.

S67a: It is assumed that the A-SMF network element 31 determines to send the DNS query message to the remote DNS server 39. In an optional implementation, the I-SMF network element 32 may use the IP address corresponding to the target DNAI as an ECS option in the DNS query message to update the DNS query message, and send an updated DNS query message to the remote DNS server 39.

Based on existing EDNS, the ECS option may be added to the DNS query message, where the ECS option includes an IP address of a client, so that the DNS server better determines, based on the IP address of the client, an IP address corresponding to a domain name that the client requests to query. In this application, because an IP address of the terminal device cannot reflect the location of the terminal device, the A-SMF network element 11 needs to obtain the IP address corresponding to the target DNAI. The IP address may be added to the DNS query message as the ECS option, so that the DNS server better determines, based on the ECS option, an IP address corresponding to the first domain name that the terminal device requests to query.

When receiving the first domain name, the remote DNS server 39 resolves the first domain name to obtain a target IP address corresponding to the first domain name, and sends the target IP address to the I-SMF network element 32.

In an optional implementation, the remote DNS server 39 may send, in response to the DNS query message, a DNS response to the I-SMF network element 32, where the DNS response includes the target IP address.

S67b: The I-SMF network element 32 may send the first domain name to the local DNS server 38 based on the IP address of the local DNS server corresponding to the target DNAI.

For example, the I-SMF network element 32 may send the DNS query message including the first domain name to the local DNS server 38.

When receiving the first domain name, the local DNS server 38 resolves the first domain name to obtain a target IP address corresponding to the first domain name, and sends the target IP address to the I-SMF network element 32.

In an optional implementation, the local DNS server 38 may send, in response to the DNS query message, a DNS response to the I-SMF network element 32, where the DNS response includes the target IP address.

When receiving the target IP address, the I-SMF network element 12 may separately perform S68 and S69.

S68: When receiving the target IP address, the I-SMF network element 32 determines, based on the target IP address, whether to select the local PSA network element 37 and the ULCL/BP 310 for the terminal device 36.

Specifically, the I-SMF network element 32 may determine whether a DNAI corresponding to the target IP address indicates the location information of the MEC platform. If the DNAI corresponding to the target IP address indicates the location information of the MEC platform, the I-SMF network element 32 selects the local PSA network element 37 and the ULCL/BP 310 for the terminal device 36, and performs an insertion procedure of the ULCL/BP 310.

Alternatively, the I-SMF network element 32 may determine whether the target IP address belongs to a prestored IP address list. If the target IP address belongs to the prestored IP address list, the I-SMF network element 32 selects the local PSA network element 37 and the ULCL/BP 310, and performs an insertion procedure of the ULCL/BP 310.

If the I-SMF network element 32 chooses to insert the BP, the A-SMF network element 31 needs to allocate a new IPV6 prefix to the terminal device 36, and sends the new IPv6 prefix to the terminal device 36 through the remote PSA network element 34.

S69: When receiving the target IP address, the I-SMF network element 32 further sends the target IP address to the terminal device 36 through the I-UPF network element 35.

For example, the I-SMF network element 32 may send the DNS response including the target IP address to the terminal device 36 through the I-UPF network element 35.

Further, the terminal device 36 may access, through the local PSA network element 37 based on the target IP address, the first application corresponding to the first domain name.

In a scenario in which the I-SMF network element is inserted for a PDU session of the terminal device in the system, when the terminal device needs to access the first application corresponding to the first domain name, the I-SMF network element may obtain the application information of the I-SMF network element from the UDR, to determine the first application platform on which the first application corresponding to the first domain name is located, and obtains, from the DNS server based on related information of the first application platform, the target IP address corresponding to the first domain name, so that the terminal device accesses the first application based on the target IP address, to implement application discovery. In addition, if a plurality of application platforms on which the first application corresponding to the first domain name is located are deployed in the application discovery system, the first application platform is determined based on the location information of the terminal device. In this embodiment of this application, the first application platform can be an application platform that is in the plurality of application platforms corresponding to the first domain name and that is close to the terminal device, to reduce a service delay.

Figure 7:
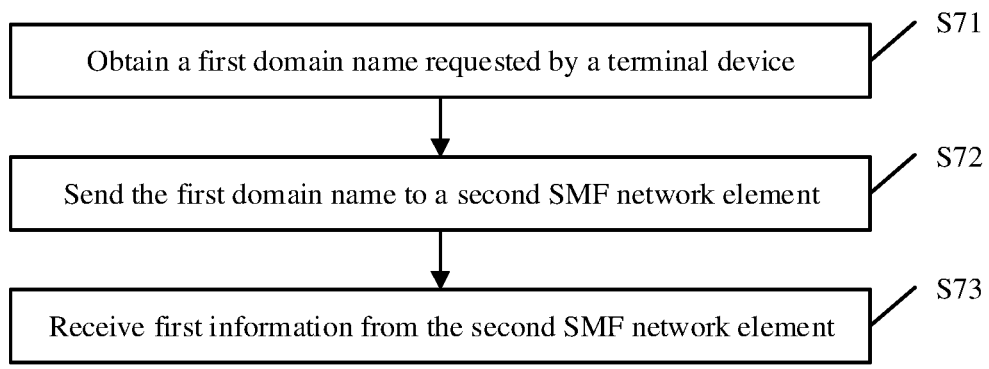
FIG. 7 is a schematic flowchart of another application discovery method according to an embodiment of this application.

FIG. 7 is a schematic flowchart of another application discovery method according to an embodiment of this application. The application discovery method is applied to a first SMF network element. The application discovery method shown in FIG. 7 includes the following steps.

S71: Obtain a first domain name requested by a terminal device.

In this embodiment of this application, the first domain name may be received by the first SMF network element from a UPF network element. The first SMF network element is an A-SMF network element.

In an optional implementation, the first domain name may be an FQDN.

Specifically, when the terminal device establishes a PDU session at a first location, the PDU session corresponds to an anchor UPF network element and an anchor SMF network element. The anchor SMF network element is configured to manage the anchor UPF network element. In this embodiment of this application, the first SMF network element is the anchor SMF network element.

When the terminal device moves from the first location to a second location, an access network element currently corresponding to the PDU session cannot be directly connected to the anchor UPF network element. In this case, an I-UPF network element and a second SMF network element are inserted for the PDU session in a communication system in which the first SMF network element is located. The I-UPF network element is configured to establish a user plane path between an access network and the anchor UPF network element. The second SMF network element is an I-SMF network element, and is configured to manage the I-UPF network element.

If the terminal device needs to access a first application corresponding to the first domain name at the second location, the terminal device sends a DNS query message to the anchor UPF network element. The DNS query message includes the first domain name.

When receiving the DNS query message, the anchor UPF network element forwards the first domain name to the first SMF network element.

For example, the anchor UPF network element may forward the DNS query message including the first domain name to the first SMF network element.

Before obtaining the first domain name requested by the terminal device, the first SMF network element may further receive, from the second SMF network element, a location information list corresponding to the second SMF network element. The location information list corresponding to the second SMF network element may also be understood as a location information list served by the second SMF network element or a location information list supported by the second SMF network element. The location information list corresponding to the second SMF network element includes location information of at least one application platform corresponding to the second SMF network element. In an optional implementation, the application platform is an MEC platform.

In this embodiment of this application, if a location of an application platform is in a service area managed by the second SMF network element, it may be understood that the application platform is the application platform corresponding to the second SMF network element.

In this embodiment of this application, the location information list may be actively sent by the second SMF network element to the first SMF network element. Alternatively, the location information list may be requested by the first SMF network element from the second SMF network element.

The first SMF network element determines second information based on the location information list, and sends the second information to the second SMF network element. The second information may be understood as application information corresponding to the second SMF network element.

Specifically, the first SMF network element prestores application information, and the application information includes a correspondence between location information of an application platform and a domain name of an application. The application information includes application information corresponding to each I-SMF network element in a service area managed by the first SMF network element. The first SMF network element determines, based on the location information list and the prestored application information, the application information corresponding to the second SMF network element. The application information corresponding to the second SMF network element includes a domain name of at least one application corresponding to the second SMF network element and location information of at least one application platform on which each of the at least one application is located.

Further, the first SMF network element sends, to the anchor UPF network element, the domain name of the at least one application corresponding to the second SMF network element. Therefore, when receiving the DNS query message, the anchor UPF network element may detect whether the domain name of the at least one application corresponding to the second SMF network element includes the first domain name, to determine whether to forward the first domain name to the first SMF network element. Specifically, if the domain name of the at least one application corresponding to the second SMF network element includes the first domain name, the anchor UPF network element forwards the first domain name to the first SMF network element.

S72: Send the first domain name to the second SMF network element.

When receiving the first domain name, the first SMF network element may determine, based on the first domain name and the prestored correspondence between location information of an application platform and a domain name of an application, location information of at least one application platform corresponding to the first domain name.

Further, the first SMF network element may detect whether the location information list corresponding to the second SMF network element includes the location information of the at least one application platform corresponding to the first domain name, to determine whether to send the first domain name to the second SMF network element. Specifically, if the location information list includes the location information of the at least one application platform corresponding to the first domain name, the first SMF network element sends the first domain name to the second SMF network element.

In an optional implementation, if only one I-SMF network element (namely, the second SMF network element) is included in the service area managed by the first SMF network element, the first SMF network element may directly send the first domain name to the second SMF network element. If at least two I-SMF network elements are included in the service area managed by the first SMF network element, the first SMF network element may detect whether a location information list corresponding to each I-SMF network element includes the location information of the at least one application platform corresponding to the first domain name, to determine whether to send the first domain name to the I-SMF network element.

The second SMF network element may determine, based on current location information of the terminal device and second information obtained by the second SMF network element, a first application platform on which the first application corresponding to the first domain name is located.

Specifically, the second SMF network element may determine, based on the first domain name and the second information obtained by the second SMF network element, location information of at least one application platform on which the first application corresponding to the first domain name is located. Further, the second SMF network element may determine, based on the current location information of the terminal device and the location information of the at least one application platform on which the first application is located and/or network topology information and/or network congestion information, location information of the first application platform on which the first application is located. The first application platform is one application platform that is in the at least one application platform on which the first application is located and that is close to a current location of the terminal device, or the first application platform is one application platform that is in the at least one application platform on which the first application is located and a network topology between the first application platform and the terminal device is optimized.

The current location information of the terminal device may be obtained by the second SMF network element from an AMF network element.

Further, the second SMF network element may send first information to the first SMF network element. The first information may include information about the first application platform or an IP address of a DNS server corresponding to the first application platform, and the information about the first application platform may include the location information of the first application platform or an IP address corresponding to the first application platform.

In an optional implementation, the location information of the application platform includes a DNAI corresponding to the application platform. In other words, the location information of the first application platform includes a DNAI corresponding to the first application platform. The location information list corresponding to the second SMF network element includes a DNAI list.

An IP address corresponding to one application platform is an IP address required on a routing path when a network element device in a network accesses the application platform, or an IP address corresponding to one application platform is an IP address required on a communication path when a network element device in a network communicates with the application platform. For example, an IP address corresponding to one application platform may be a public IP address required for accessing the application platform. Alternatively, an IP address corresponding to one application platform may be a subnet IP address or a full IP address required for accessing the application platform.

Because a DNAI is for uniquely identifying location information of an application platform, an IP address corresponding to each application platform may also be understood as an IP address corresponding to each DNAI.

S73: Receive the first information from the second SMF network element.

The first information is for obtaining a target IP address corresponding to the first domain name.

In an optional implementation, the first SMF network element may send the first domain name to a local DNS server or a remote DNS server based on the first information, so that the local DNS server or the remote DNS server resolves the first domain name to obtain the target IP address and returns the target IP address to the first SMF network element.

In this embodiment of this application, the local DNS server may be understood as a DNS server located in a local data center. The local DNS server is mainly responsible for resolving a domain name of an application deployed on a local application platform. For example, one or more applications may be deployed on one application platform. In this case, a DNS server serving the application platform may be referred to as a local DNS server, and the local DNS server is responsible for resolving a domain name of an application deployed on the application platform.

The remote DNS server may be a centralized DNS server deployed by an operator. In a session establishment process, the first SMF network element may send an IP address of the remote DNS server to the terminal device.

Further, specifically, when the first information includes the location information of the first application platform, the first SMF network element may determine, based on the location information of the first application platform and a prestored correspondence between location information and an IP address of an application platform, the IP address corresponding to the first application platform, use the IP address corresponding to the first application platform as an ECS option in the DNS query message to update the DNS query message, and send an updated DNS query message to the remote DNS server.

Alternatively, when the first information includes the IP address corresponding to the first application platform, the first SMF network element may use the IP address corresponding to the first application platform as an ECS option in the DNS query message to update the DNS query message, and send an updated DNS query message to the remote DNS server.

When the first information includes the location information of the first application platform, the first SMF network element may further determine, based on the location information of the first application platform and a prestored correspondence between location information and an IP address of a DNS server of an application platform, the IP address of the DNS server corresponding to the first application platform, and send the DNS query message to the local DNS server based on the IP address of the DNS server corresponding to the first application platform.

Alternatively, when the first information includes the IP address of the DNS server corresponding to the first application platform, the first SMF network element may send the DNS query message to the local DNS server based on the IP address of the DNS server corresponding to the first application platform.

Further, the first SMF network element sends the target IP address to the terminal device through the anchor UPF network element. Therefore, the terminal device may access the first application by using the target IP address.

In another optional implementation, the first SMF network element forwards the first information to the anchor UPF network element. Therefore, the anchor UPF network element may send the first domain name to the local DNS server or the remote DNS server based on the first information, so that the local DNS server or the remote DNS server resolves the first domain name to obtain the target IP address and returns the target IP address to the anchor UPF network element.

Further, the anchor UPF network element sends the target IP address to the terminal device. Therefore, the terminal device may access the first application by using the target IP address.

In a scenario in which the I-SMF network element is inserted for the PDU session of the terminal device in the system, when the terminal device needs to access the first application corresponding to the first domain name, in this embodiment of this application, the first application platform on which the first application corresponding to the first domain name is located may be determined through interaction between the A-SMF network element and the I-SMF network element, and the target IP address corresponding to the first domain name is obtained from the DNS server based on related information of the first application platform, so that the terminal device accesses the first application based on the target IP address, to implement application discovery. In addition, if a plurality of application platforms on which the first application corresponding to the first domain name is located are deployed in the application discovery system, the first application platform is determined based on the location information of the terminal device. In this embodiment of this application, the first application platform can be an application platform that is in the plurality of application platforms corresponding to the first domain name and that is close to the terminal device, to reduce a service delay.

Figure 8:
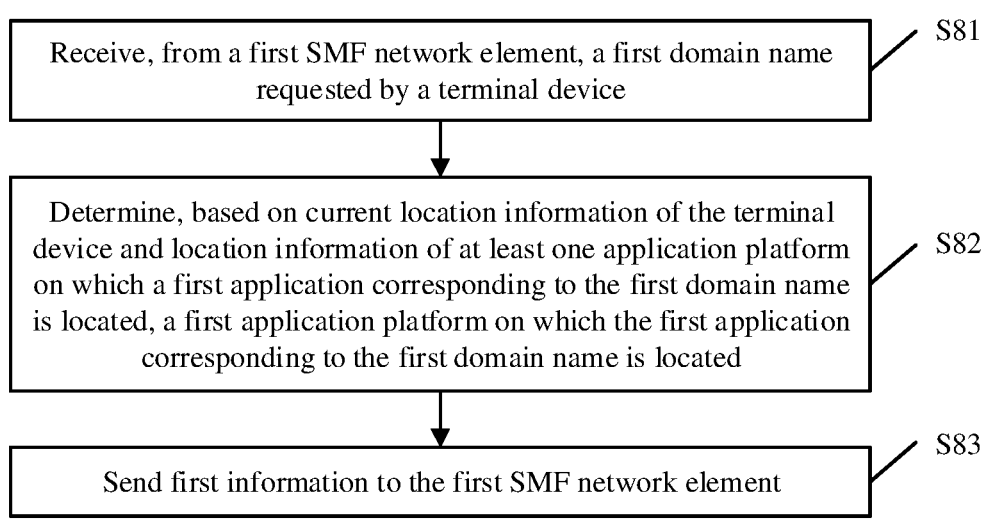
FIG. 8 is a schematic flowchart of another application discovery method according to an embodiment of this application.

FIG. 8 is a schematic flowchart of another application discovery method according to an embodiment of this application. The application discovery method is applied to a second SMF network element. The application discovery method shown in FIG. 8 includes the following steps.

S81: Receive, from a first SMF network element, a first domain name requested by a terminal device.

The first SMF network element is an A-SMF network element, and the second SMF network element is an I-SMF network element.

In an optional implementation, the first domain name may be an FQDN.

Specifically, when the terminal device establishes a PDU session at a first location, the PDU session corresponds to an anchor UPF network element and an anchor SMF network element. The anchor SMF network element is configured to manage the anchor UPF network element. In this embodiment of this application, the first SMF network element is the anchor SMF network element.

When the terminal device moves from the first location to a second location, an access network element currently corresponding to the PDU session cannot be directly connected to the anchor UPF network element. In this case, an I-UPF network element and the second SMF network element are inserted for the PDU session in a communication system in which the first SMF network element is located. The I-UPF network element is configured to establish a user plane path between an access network and the anchor UPF network element. The second SMF network element is an I-SMF network element, and is configured to manage the I-UPF network element.

If the terminal device needs to access a first application corresponding to the first domain name at the second location, the terminal device sends a DNS query message to the anchor UPF network element. The DNS query message includes the first domain name.

When receiving the DNS query message, the anchor UPF network element forwards the first domain name to the first SMF network element.

For example, the anchor UPF network element may forward the DNS query message including the first domain name to the first SMF network element.

Further, the first SMF network element sends the first domain name to the second SMF network element.

Before receiving, from the first SMF network element, the first domain name requested by the terminal device, the second SMF network element further sends, to a first network element, a location information list corresponding to the second SMF network element. The location information list corresponding to the second SMF network element may also be understood as a location information list served by the second SMF network element or a location information list supported by the second SMF network element. The location information list corresponding to the second SMF network element includes location information of at least one application platform corresponding to the second SMF network element. In an optional implementation, the application platform is an MEC platform.

In this embodiment of this application, if a location of an application platform is in a service area managed by the second SMF network element, it may be understood that the application platform is the application platform corresponding to the second SMF network element.

The first network element determines second information based on the location information list, and sends the second information to the second SMF network element. The second information may be understood as application information corresponding to the second SMF network element.

Specifically, the first network element prestores application information, and the application information includes a correspondence between location information of an application platform and a domain name of an application. The application information includes application information corresponding to each I-SMF network element in a service area managed by the first network element. The first network element determines, based on the location information list and the prestored application information, the application information corresponding to the second SMF network element. The application information corresponding to the second SMF network element includes a domain name of at least one application corresponding to the second SMF network element and location information of at least one application platform on which each of the at least one application is located.

In this embodiment of this application, the first network element is the first SMF network element or a UDR.

When the first network element is the first SMF network element, the first SMF network element may send, to the anchor UPF network element, the determined domain name of the at least one application corresponding to the second SMF network element. When the first network element is the UDR, the UDR may send the application information corresponding to the second SMF network element to the first SMF network element, and the first SMF network element further sends the domain name of the at least one application corresponding to the second SMF network element to the anchor UPF network element.

Therefore, when receiving the DNS query message, the anchor UPF network element may detect whether the domain name of the at least one application corresponding to the second SMF network element includes the first domain name, to determine whether to forward the first domain name to the first SMF network element. Specifically, if the domain name of the at least one application corresponding to the second SMF network element includes the first domain name, the anchor UPF network element forwards the first domain name to the first SMF network element.

When receiving the first domain name, the first SMF network element may determine, based on the first domain name and the prestored correspondence between location information of an application platform and a domain name of an application, location information of at least one application platform corresponding to the first domain name.

Further, the first SMF network element may detect whether the location information list corresponding to the second SMF network element includes the location information of the at least one application platform corresponding to the first domain name, to determine whether to send the first domain name to the second SMF network element. Specifically, if the location information list includes the location information of the at least one application platform corresponding to the first domain name, the first SMF network element sends the first domain name to the second SMF network element.

S82: Determine, based on current location information of the terminal device and location information of at least one application platform on which the first application corresponding to the first domain name is located, a first application platform on which the first application corresponding to the first domain name is located.

Specifically, the second SMF network element may determine, based on the first domain name and the second information obtained by the second SMF network element, the location information of the at least one application platform on which the first application corresponding to the first domain name is located.

Further, the second SMF network element may determine, based on the current location information of the terminal device and the location information of the at least one application platform on which the first application is located and/or network topology information and/or network congestion information, location information of the first application platform on which the first application is located. The first application platform is one application platform that is in the at least one application platform on which the first application is located and that is close to a current location of the terminal device, or the first application platform is one application platform that is in the at least one application platform on which the first application is located and a network topology between the first application platform and the terminal device is optimized.

Further, the second SMF network element may determine, based on the location information of the first application platform and a prestored correspondence between location information and an IP address of an application platform, an IP address corresponding to the first application platform.

An IP address corresponding to one application platform is an IP address required on a routing path when a network element device in a network accesses the application platform, or an IP address corresponding to one application platform is an IP address required on a communication path when a network element device in a network communicates with the application platform. For example, an IP address corresponding to one application platform may be a public IP address required for accessing the application platform. Alternatively, an IP address corresponding to one application platform may be a subnet IP address or a full IP address required for accessing the application platform.

Because a DNAI is for uniquely identifying location information of an application platform, an IP address corresponding to each application platform may also be understood as an IP address corresponding to each DNAI.

The second SMF network element may determine, based on the location information of the first application platform and a prestored correspondence between location information and an IP address of a DNS server of an application platform, an IP address of a DNS server corresponding to the first application platform.

S83: Send first information to the first SMF network element.

The first information includes information about the first application platform or the IP address of the DNS server corresponding to the first application platform, and the information about the first application platform may include the location information of the first application platform or the IP address corresponding to the first application platform.

In an optional implementation, the location information of the application platform includes a DNAI corresponding to the application platform. In other words, the location information of the first application platform includes a DNAI corresponding to the first application platform. The location information list corresponding to the second SMF network element includes a DNAI list.

In this embodiment of this application, the first information is for obtaining a target IP address corresponding to the first domain name.

Specifically, the first SMF network element may send the first domain name to a local DNS server or a remote DNS server based on the first information, so that the local DNS server or the remote DNS server resolves the first domain name to obtain the target IP address and returns the target IP address to the first SMF network element.

In this embodiment of this application, the local DNS server may be understood as a DNS server located in a local data center. The local DNS server is mainly responsible for resolving a domain name of an application deployed on a local application platform. For example, one or more applications may be deployed on one application platform. In this case, a DNS server serving the application platform may be referred to as a local DNS server, and the local DNS server is responsible for resolving a domain name of an application deployed on the application platform.

The remote DNS server may be a centralized DNS server deployed by an operator. In a session establishment process, the first SMF network element may send an IP address of the remote DNS server to the terminal device.

Further, the first SMF network element sends the target IP address to the terminal device through the anchor UPF network element. Therefore, the terminal device may access the first application by using the target IP address.

In a scenario in which the I-SMF network element is inserted for the PDU session of the terminal device in the system, when the terminal device needs to access the first application corresponding to the first domain name, in this embodiment of this application, the first application platform on which the first application corresponding to the first domain name is located may be determined through interaction between the A-SMF network element and the I-SMF network element, and the target IP address corresponding to the first domain name is obtained from the DNS server based on related information of the first application platform, so that the terminal device accesses the first application based on the target IP address, to implement application discovery. In addition, if a plurality of application platforms on which the first application corresponding to the first domain name is located are deployed in the application discovery system, the first application platform is determined based on the location information of the terminal device. In this embodiment of this application, the first application platform can be an application platform that is in the plurality of application platforms corresponding to the first domain name and that is close to the terminal device, to reduce a service delay.

Figure 9:
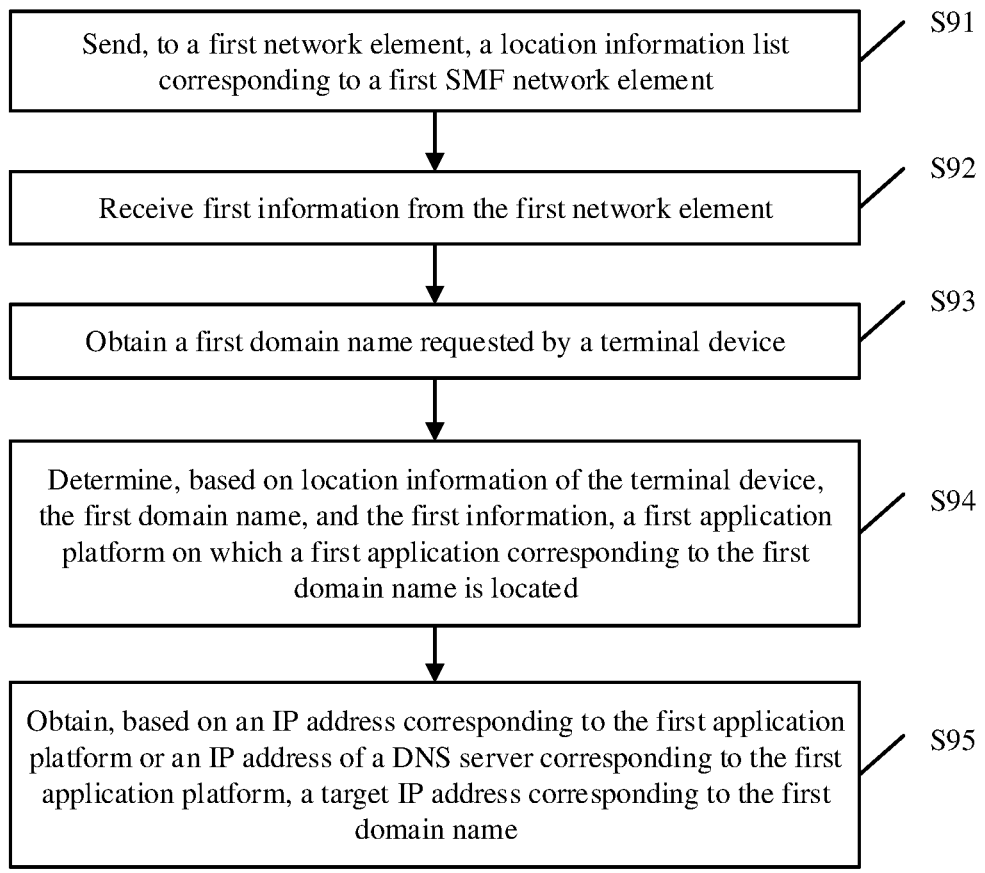
FIG. 9 is a schematic flowchart of another application discovery method according to an embodiment of this application.

FIG. 9 is a schematic flowchart of another application discovery method according to an embodiment of this application. The application discovery method is applied to a first SMF network element. The application discovery method shown in FIG. 9 includes the following steps.

S91: Send, to a first network element, a location information list corresponding to the first SMF network element.

In this embodiment of this application, the first network element is a second SMF network element or a UDR, and the second SMF network element is an A-SMF network element.

It should be noted that when a terminal device establishes a PDU session at a first location, the PDU session corresponds to an anchor UPF network element and an anchor SMF network element. The anchor SMF network element is configured to manage the anchor UPF network element. In this embodiment of this application, the second SMF network element is the anchor SMF network element.

When the terminal device moves from the first location to a second location, an access network element currently corresponding to the PDU session cannot be directly connected to the anchor UPF network element. In this case, an I-UPF network element and the first SMF network element are inserted for the PDU session in a communication system in which the first SMF network element is located. The I-UPF network element is configured to establish a user plane path between an access network and the anchor UPF network element. The first SMF network element is an I-SMF network element, and is configured to manage the I-UPF network element.

The location information list corresponding to the first SMF network element may also be understood as a location information list served by the first SMF network element or a location information list supported by the first SMF network element. The location information list corresponding to the first SMF network element includes location information of at least one application platform corresponding to the first SMF network element. In an optional implementation, the application platform is an MEC platform.

In this embodiment of this application, if a location of an application platform is in a service area managed by the first SMF network element, it may be understood that the application platform is the application platform corresponding to the first SMF network element.

The first network element determines first information based on the location information list, and sends the first information to the first SMF network element. The first information may be understood as application information corresponding to the first SMF network element.

Specifically, the first network element prestores application information, and the application information includes a correspondence between location information of an application platform and a domain name of an application. The application information includes application information corresponding to each I-SMF network element in a service area managed by the first network element. The first network element determines, based on the location information list and the prestored application information, the application information corresponding to the first SMF network element. The application information corresponding to the first SMF network element includes a domain name of at least one application corresponding to the first SMF network element and location information of at least one application platform on which each of the at least one application is located.

S92: Receive first information from the first network element.

S93: Obtain a first domain name requested by the terminal device.

In this embodiment of this application, the first domain name may be received by the first SMF network element from the I-UPF network element. In an optional implementation, the first domain name may be an FQDN.

Specifically, if the terminal device needs to access a first application corresponding to the first domain name at the second location, the terminal device sends a DNS query message to the I-UPF network element. The DNS query message includes the first domain name.

When receiving the DNS query message, the I-UPF network element forwards the first domain name to the first SMF network element.

When receiving the DNS query message, the I-UPF network element may detect whether the domain name of the at least one application corresponding to the first SMF network element includes the first domain name, to determine whether to forward the first domain name to the first SMF network element. Specifically, if the domain name of the at least one application corresponding to the first SMF network element includes the first domain name, the I-UPF network element forwards the first domain name to the first SMF network element.

For example, the I-UPF network element may forward the DNS query message including the first domain name to the first SMF network element.

S94: Determine, based on location information of the terminal device, the first domain name, and the first information, a first application platform on which the first application corresponding to the first domain name is located.

Specifically, the first SMF network element may determine, based on the first domain name and the first information, location information of at least one application platform on which the first application corresponding to the first domain name is located.

Further, the first SMF network element may determine, based on the location information of the terminal device and the location information of the at least one application platform on which the first application is located and/or network topology information and/or network congestion information, location information of the first application platform on which the first application is located. The first application platform is one application platform that is in the at least one application platform on which the first application is located and that is close to a current location of the terminal device, or the first application platform is one application platform that is in the at least one application platform on which the first application is located and a network topology between the first application platform and the terminal device is optimized. In an optional implementation, the location information of the application platform includes a DNAI corresponding to the application platform. In other words, the location information of the first application platform includes a DNAI corresponding to the first application platform. The location information list includes a DNAI list.

Further, the first SMF network element may determine, based on the location information of the first application platform and a prestored correspondence between location information and an IP address of an application platform, an IP address corresponding to the first application platform.

An IP address corresponding to one application platform is an IP address required on a routing path when a network element device in a network accesses the application platform, or an IP address corresponding to one application platform is an IP address required on a communication path when a network element device in a network communicates with the application platform. For example, an IP address corresponding to one application platform may be a public IP address required for accessing the application platform. Alternatively, an IP address corresponding to one application platform may be a subnet IP address or a full IP address required for accessing the application platform.

Because a DNAI is for uniquely identifying location information of an application platform, an IP address corresponding to each application platform may also be understood as an IP address corresponding to each DNAI.

The first SMF network element may determine, based on the location information of the first application platform and a prestored correspondence between location information and an IP address of a DNS server of an application platform, an IP address of a DNS server corresponding to the first application platform.

S95: Obtain, based on the IP address corresponding to the first application platform or the IP address of the DNS server corresponding to the first application platform, a target IP address corresponding to the first domain name.

Specifically, the first SMF network element may send the first domain name to a local DNS server or a remote DNS server based on the IP address corresponding to the first application platform or the IP address of the DNS server corresponding to the first application platform, so that the local DNS server or the remote DNS server resolves the first domain name to obtain the target IP address and returns the target IP address to the first SMF network element.

In this embodiment of this application, the local DNS server may be understood as a DNS server located in a local data center. The local DNS server is mainly responsible for resolving a domain name of an application deployed on a local application platform. For example, one or more applications may be deployed on one application platform. In this case, a DNS server serving the application platform may be referred to as a local DNS server, and the local DNS server is responsible for resolving a domain name of an application deployed on the application platform.

The remote DNS server may be a centralized DNS server deployed by an operator.

Further, specifically, the first SMF network element may use the IP address corresponding to the first application platform as an ECS option in the DNS query message to update the DNS query message, and send an updated DNS query message to the remote DNS server.

Alternatively, the first SMF network element may send the DNS query message to the local DNS server based on the IP address of the DNS server corresponding to the first application platform.

Further, the first SMF network element sends the target IP address to the terminal device through the I-UPF network element. Therefore, the terminal device may access the first application by using the target IP address.

In a scenario in which the I-SMF network element is inserted for the PDU session of the terminal device in the system, when the terminal device needs to access the first application corresponding to the first domain name, the I-SMF network element may obtain the application information of the I-SMF network element from the first network element, to determine the first application platform on which the first application corresponding to the first domain name is located, and obtains, from the DNS server based on related information of the first application platform, the target IP address corresponding to the first domain name, so that the terminal device accesses the first application based on the target IP address, to implement application discovery. In addition, if a plurality of application platforms on which the first application corresponding to the first domain name is located are deployed in the application discovery system, the first application platform is determined based on the location information of the terminal device. In this embodiment of this application, the first application platform can be an application platform that is in the plurality of application platforms corresponding to the first domain name and that is close to the terminal device, to reduce a service delay.

Figure 10:
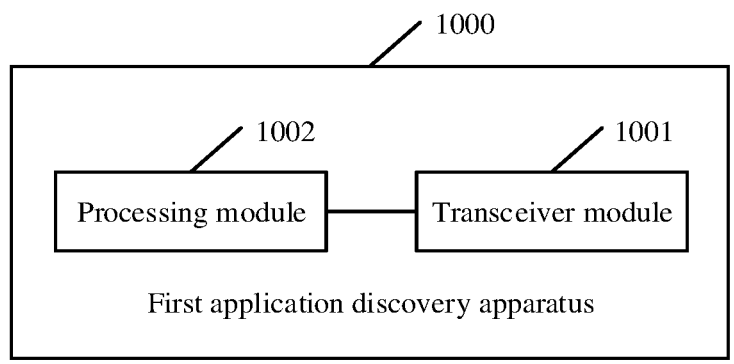
FIG. 10 is a schematic diagram of a framework of a first application discovery apparatus according to an embodiment of this application.

FIG. 10 is a schematic diagram of a framework of a first application discovery apparatus according to an embodiment of this application. As shown in FIG. 10, the first application discovery apparatus 1000 may include a transceiver module 1001 and a processing module 1002.

The transceiver module 1001 is configured to receive, from a second SMF network element, a location information list corresponding to the second SMF network element. The location information list includes location information of at least one application platform corresponding to the second SMF network element.

The processing module 1002 is configured to determine second information based on the location information list. The second information includes a first domain name and location information of at least one application platform on which a first application corresponding to the first domain name is located.

The transceiver module 1001 is further configured to send the second information to the second SMF network element.

The transceiver module 1001 is further configured to obtain the first domain name requested by a terminal device.

In an optional implementation, when obtaining the first domain name requested by the terminal device, the transceiver module 1001 is specifically configured to receive the first domain name from a UPF network element. The first domain name is received by the UPF network element from the terminal device.

The transceiver module 1001 is further configured to send the first domain name to the second SMF network element.

In an optional implementation, when sending the first domain name to the second SMF network element, the transceiver module 1001 is specifically configured to: determine, based on the first domain name and a stored correspondence between location information of an application platform and a domain name of an application, the location information of the at least one application platform on which the first application corresponding to the first domain name is located; and if the location information list includes the location information of the at least one application platform on which the first application is located, send the first domain name to the second SMF network element.

The transceiver module 1001 is further configured to receive first information from the second SMF network element. The first information includes information about a first application platform or an IP address of a domain name system DNS server corresponding to the first application platform, the first application platform is an application platform on which the first application corresponding to the first domain name is located, and the first information is for obtaining a target IP address corresponding to the first domain name.

In an optional implementation, the information about the first application platform includes location information of the first application platform or an IP address corresponding to the first application platform.

In an optional implementation, the location information list includes a DNAI list, and the location information of the at least one application platform on which the first application corresponding to the first domain name is located includes a DNAI corresponding to the at least one application platform on which the first application is located.

Based on a same inventive concept, problem-resolving principles and beneficial effects of the first application discovery apparatus 1000 provided in this embodiment of this application are similar to those of the application discovery method embodiment shown in FIG. 7 of this application. Therefore, for implementation of the first application discovery apparatus 1000, refer to implementation of the application discovery method shown in FIG. 7. Repeated parts are not described again.

Figure 11:
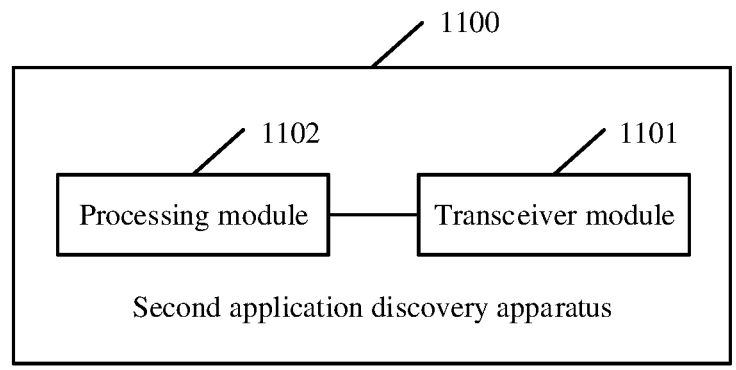
FIG. 11 is a schematic diagram of a framework of a second application discovery apparatus according to an embodiment of this application.

FIG. 11 is a schematic diagram of a framework of a second application discovery apparatus according to an embodiment of this application. As shown in FIG. 11, the second application discovery apparatus 1100 may include a transceiver module 1101 and a processing module 1102.

The transceiver module 1101 is configured to send, to a first network element, a location information list corresponding to the second application discovery apparatus

1100. The location information list includes location information of at least one application platform corresponding to the second application discovery apparatus 1100, and the first network element is a first SMF network element or a UDR.

The transceiver module 1101 is further configured to receive second information from the first network element. The second information includes a first domain name and location information of at least one application platform on which a first application corresponding to the first domain name is located.

The transceiver module 1101 is further configured to receive, from the first SMF network element, the first domain name requested by a terminal device.

The processing module 1102 is configured to determine, based on current location information of the terminal device and the location information of the at least one application platform on which the first application corresponding to the first domain name is located, a first application platform on which the first application corresponding to the first domain name is located.

The transceiver module 1101 is further configured to send first information to the first SMF network element. The first information includes information about the first application platform or an IP address of a DNS server corresponding to the first application platform, and the first information is for obtaining a target IP address corresponding to the first domain name.

In an optional implementation, the information about the first application platform includes location information of the first application platform or an IP address corresponding to the first application platform.

In an optional implementation, the location information list includes a DNAI list, and the location information of the at least one application platform on which the first application corresponding to the first domain name is located includes a DNAI corresponding to the at least one application platform on which the first application is located.

Based on a same inventive concept, problem-resolving principles and beneficial effects of the second application discovery apparatus 1100 provided in this embodiment of this application are similar to those of the application discovery method embodiment shown in FIG. 8 of this application. Therefore, for implementation of the second application discovery apparatus 1100, refer to implementation of the application discovery method shown in FIG. 8. Repeated parts are not described again.

Figure 12:
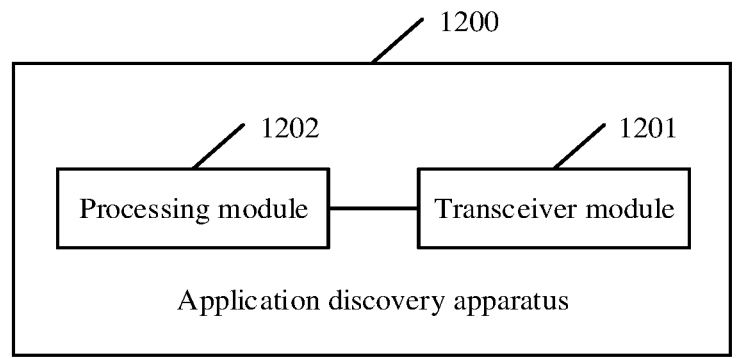
FIG. 12 is a schematic diagram of a framework of an application discovery apparatus according to an embodiment of this application.

FIG. 12 is a schematic diagram of a framework of an application discovery apparatus according to an embodiment of this application. As shown in FIG. 12, the application discovery apparatus 1200 may include a transceiver module 1201 and a processing module 1202.

The transceiver module 1201 is configured to send, to a first network element, a location information list corresponding to the application discovery apparatus 1200. The location information list includes location information of at least one application platform corresponding to the application discovery apparatus 1200, and the first network element is a second SMF network element or a UDR.

The transceiver module 1201 is further configured to receive first information from the first network element. The first information includes a domain name of at least one application corresponding to the application discovery apparatus 1200 and location information of at least one application platform on which each of the at least one application is located.

The transceiver module 1201 is further configured to obtain a first domain name requested by a terminal device. The first information includes the first domain name.

In an optional implementation, when obtaining the first domain name requested by the terminal device, the transceiver module 1201 is specifically configured to receive the first domain name from a UPF network element. The first domain name is received by the UPF network element from the terminal device.

The processing module 1202 is configured to determine, based on location information of the terminal device, the first domain name, and the first information, a first application platform on which a first application corresponding to the first domain name is located.

In an optional implementation, when determining, based on the location information of the terminal device, the first domain name, and the first information, the first application platform on which the first application corresponding to the first domain name is located, the processing module 1202 is specifically configured to: determine, based on the first domain name and the first information, location information of at least one application platform on which the first application corresponding to the first domain name is located; and determine, based on the location information of the terminal device and the location information of the at least one application platform on which the first application is located, the first application platform on which the first application corresponding to the first domain name is located.

The transceiver module 1201 is further configured to obtain, based on an IP address corresponding to the first application platform or an IP address of a DNS server corresponding to the first application platform, a target IP address corresponding to the first domain name.

In an optional implementation, the location information list includes a DNAI list, and the location information of the at least one application platform on which the first application corresponding to the first domain name is located includes a DNAI corresponding to the at least one application platform on which the first application is located.

Based on a same inventive concept, problem-resolving principles and beneficial effects of the application discovery apparatus 1200 provided in this embodiment of this application are similar to those of the application discovery method embodiment shown in FIG. 9 of this application. Therefore, for implementation of the application discovery apparatus 1200, refer to implementation of the application discovery method shown in FIG. 9. Repeated parts are not described again.

Figure 13:
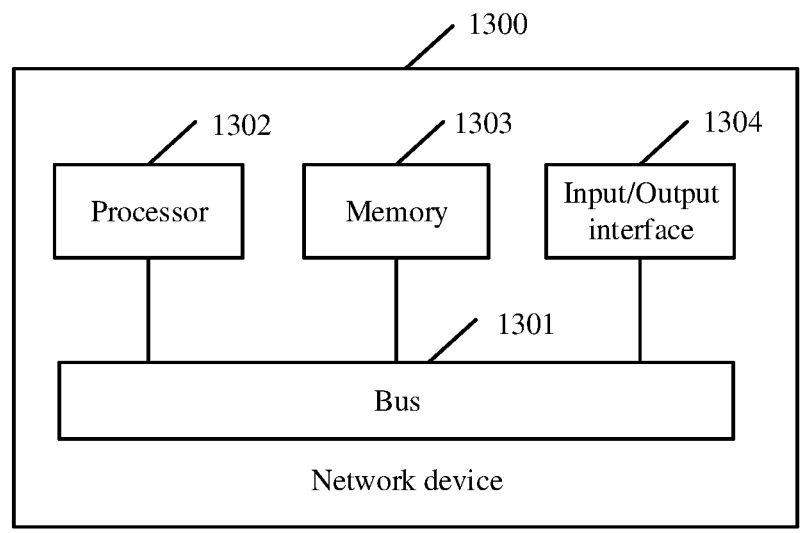
FIG. 13 is a schematic diagram of a framework of a network device according to an embodiment of this application.

FIG. 13 is a schematic diagram of a framework of a network device 1300 according to an embodiment of this application. As shown in FIG. 13, the network device 1300 may include a bus 1301, a processor 1302, a memory 1303, and an input/output interface 1304. The bus 1301 is configured to connect the processor 1302, the memory 1303, and the input/output interface 1304 to each other, so that the foregoing elements can communicate with each other. The memory 1303 is configured to store one or more computer programs, and the computer program includes computer instructions. The input/output interface 1304 is configured to control a communication connection between the network device 1300 and another device (for example, a terminal device).

Specifically, the processor 1302 is configured to invoke the computer instructions to perform the following operations: obtaining a first domain name requested by the terminal device; sending the first domain name to a second SMF network element; and receiving first information from the second SMF network element, where the first information includes information about a first application platform or an IP address of a DNS server corresponding to the first application platform, the first application platform is an application platform on which a first application corresponding to the first domain name is located, and the first information is for obtaining a target IP address corresponding to the first domain name.

In an optional implementation, when the processor 1302 is configured to invoke the computer instructions to obtain the first domain name requested by the terminal device, the processor 1302 specifically performs the following operation: receiving the first domain name from a UPF network element, where the first domain name is received by the UPF network element from the terminal device.

In an optional implementation, before the processor 1302 is configured to invoke the computer instructions to obtain the first domain name requested by the terminal device, the processor 1302 further performs the following operations: receiving, from the second SMF network element, a location information list corresponding to the second SMF network element, where the location information list includes location information of at least one application platform corresponding to the second SMF network element; and determining second information based on the location information list, and sending the second information to the second SMF network element, where the second information includes the first domain name and location information of at least one application platform on which the first application corresponding to the first domain name is located.

In an optional implementation, when the processor 1302 is configured to invoke the computer instructions to send the first domain name to the second SMF network element, the processor 1302 specifically performs the following operations: determining, based on the first domain name and a stored correspondence between location information of an application platform and a domain name of an application, the location information of the at least one application platform on which the first application corresponding to the first domain name is located; and if the location information list includes the location information of the at least one application platform on which the first application is located, sending the first domain name to the second SMF network element.

In an optional implementation, the information about the first application platform includes location information of the first application platform or an IP address corresponding to the first application platform.

In an optional implementation, the location information list includes a DNAI list, and the location information of the at least one application platform on which the first application corresponding to the first domain name is located includes a DNAI corresponding to the at least one application platform on which the first application is located.

The processor 1302 may be a central processing unit (CPU). The memory 1303 may be any type of memory, for example, may be a ROM, a RAM, a nonvolatile random access memory, or the like.

Based on a same inventive concept, problem-resolving principles and beneficial effects of the network device 1300 provided in this embodiment of this application are similar to those of the application discovery method embodiment shown in FIG. 7 of this application. Therefore, for implementation of the network device 1300, refer to implementation of the application discovery method shown in FIG. 7. Repeated parts are not described again.

Figure 14:
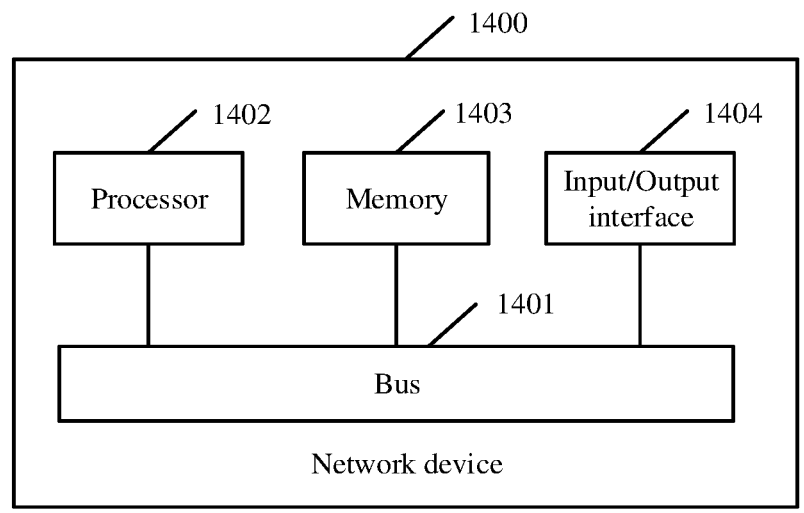
FIG. 14 is a schematic diagram of a framework of another network device according to an embodiment of this application.

FIG. 14 is a schematic diagram of a framework of another network device 1400 according to an embodiment of this application. As shown in FIG. 14, the network device 1400 may include a bus 1401, a processor 1402, a memory 1403, and an input/output interface 1404. The bus 1401 is configured to connect the processor 1402, the memory 1403, and the input/output interface 1404 to each other, so that the foregoing elements can communicate with each other. The memory 1403 is configured to store one or more computer programs, and the computer program includes computer instructions. The input/output interface 1404 is configured to control a communication connection between the network device 1400 and another device (for example, a terminal device).

Specifically, the processor 1402 is configured to invoke the computer instructions to perform the following operations: receiving, from a first SMF network element, a first domain name requested by the terminal device; determining, based on current location information of the terminal device and location information of at least one application platform on which a first application corresponding to the first domain name is located, a first application platform on which the first application corresponding to the first domain name is located; and sending first information to the first SMF network element, where the first information includes information about the first application platform or an IP address of a DNS server corresponding to the first application platform, and the first information is for obtaining a target IP address corresponding to the first domain name.

In an optional implementation, before the processor 1402 is configured to invoke the computer instructions to receive, from the first SMF network element, the first domain name requested by the terminal device, the processor 1402 further performs the following operations: sending, to a first network element, a location information list corresponding to the network device 1400, where the location information list includes location information of at least one application platform corresponding to the network device 1400, and the first network element is the first SMF network element or a UDR; and receiving second information from the first network element, where the second information includes the first domain name and the location information of the at least one application platform on which the first application corresponding to the first domain name is located.

In an optional implementation, the information about the first application platform includes location information of the first application platform or an IP address corresponding to the first application platform.

In an optional implementation, the location information list includes a DNAI list, and the location information of the at least one application platform on which the first application corresponding to the first domain name is located includes a DNAI corresponding to the at least one application platform on which the first application is located.

The processor 1402 may be a CPU. The memory 1403 may be any type of memory, for example, may be a ROM, a RAM, a nonvolatile random access memory, or the like.

Based on a same inventive concept, problem-resolving principles and beneficial effects of the network device 1400 provided in this embodiment of this application are similar to those of the application discovery method embodiment shown in FIG. 8 of this application. Therefore, for implementation of the network device 1400, refer to implementation of the application discovery method shown in FIG. 8. Repeated parts are not described again.

Figure 15:
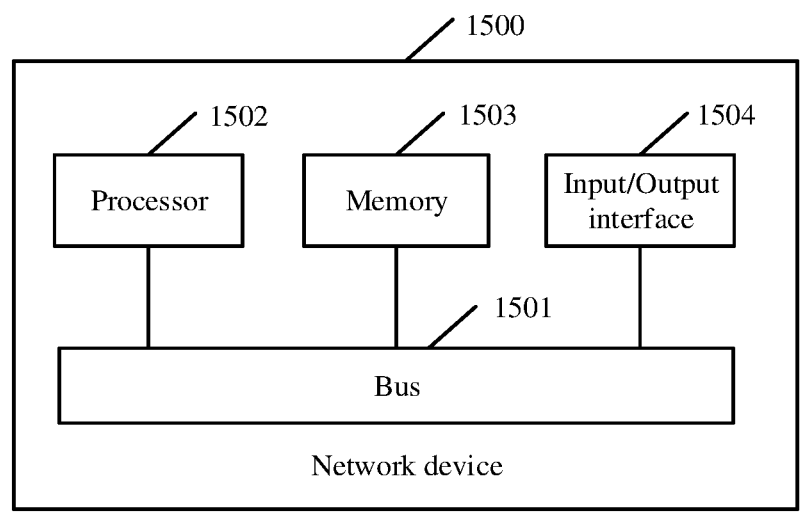
FIG. 15 is a schematic diagram of a framework of still another network device according to an embodiment of this application.

FIG. 15 is a schematic diagram of a framework of still another network device 1500 according to an embodiment of this application. As shown in FIG. 15, the network device 1500 may include a bus 1501, a processor 1502, a memory 1503, and an input/output interface 1504. The bus 1501 is configured to connect the processor 1502, the memory 1503, and the input/output interface 1504 to each other, so that the foregoing elements can communicate with each other. The memory 1503 is configured to store one or more computer programs, and the computer program includes computer instructions. The input/output interface 1504 is configured to control a communication connection between the network device 1500 and another device (for example, a terminal device).

Specifically, the processor 1502 is configured to invoke the computer instructions to perform the following operations: sending, to a first network element, a location information list corresponding to the network device 1500, where the location information list includes location information of at least one application platform corresponding to the network device 1500, and the first network element is a second SMF network element or a UDR; receiving first information from the first network element, where the first information includes a domain name of at least one application corresponding to the network device 1500 and location information of at least one application platform on which each of the at least one application is located; obtaining a first domain name requested by the terminal device, where the first information includes the first domain name; determining, based on location information of the terminal device, the first domain name, and the first information, a first application platform on which a first application corresponding to the first domain name is located; and obtaining, based on an IP address corresponding to the first application platform or an IP address of a DNS server corresponding to the first application platform, a target IP address corresponding to the first domain name.

In an optional implementation, before the processor 1502 is configured to invoke the computer instructions to obtain the first domain name requested by the terminal device, the processor 1502 further performs the following operation: receiving the first domain name from a UPF network element, where the first domain name is received by the UPF network element from the terminal device.

In an optional implementation, when the processor 1502 is configured to invoke the computer instructions to determine, based on the location information of the terminal device, the first domain name, and the first information, the first application platform on which the first application corresponding to the first domain name is located, the processor 1502 specifically performs the following operations: determining, based on the first domain name and the first information, location information of at least one application platform on which the first application corresponding to the first domain name is located; and determining, based on the location information of the terminal device and the location information of the at least one application platform on which the first application is located, the first application platform on which the first application corresponding to the first domain name is located.

In an optional implementation, the location information list includes a DNAI list, and the location information of the at least one application platform on which the first application corresponding to the first domain name is located includes a DNAI corresponding to the at least one application platform on which the first application is located.

The processor 1502 may be a CPU. The memory 1503 may be any type of memory, for example, may be a ROM, a RAM, a nonvolatile random access memory, or the like.

Based on a same inventive concept, problem-resolving principles and beneficial effects of the network device 1500 provided in this embodiment of this application are similar to those of the application discovery method embodiment shown in FIG. 9 of this application. Therefore, for implementation of the network device 1500, refer to implementation of the application discovery method shown in FIG. 9. Repeated parts are not described again.

Figure 16:
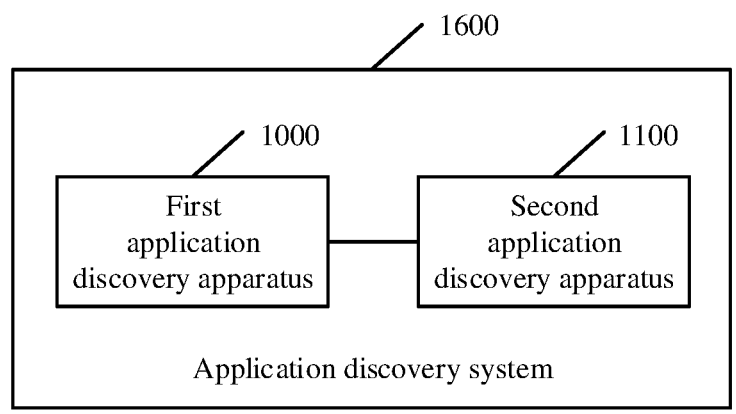
FIG. 16 is a schematic diagram of a framework of still another application discovery system according to an embodiment of this application.

FIG. 16 is a schematic diagram of a framework of still another application discovery system according to an embodiment of this application. As shown in FIG. 16, the application discovery system 1600 may include the first application discovery apparatus 1000 shown in FIG. 10 and the second application discovery apparatus 1100 shown in FIG. 11.

Based on a same inventive concept, problem-resolving principles and beneficial effects of the application discovery system 1600 provided in this embodiment of this application are similar to those of the application discovery method embodiment shown in FIG. 7 or FIG. 8 of this application. Therefore, for implementation of the application discovery system 1600, refer to implementation of the application discovery method shown in FIG. 7 or FIG. 8. Repeated parts are not described again.

It may be understood that the accompanying drawings in embodiments of this application show only simplified designs of the foregoing communication apparatuses. In actual application, the communication apparatus is not limited to the foregoing structure.

It should be noted that the processor in embodiments of this application may be a CPU, a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. A memory may be integrated into the processor or may be disposed separately from the processor.

An embodiment of this application further provides a chip. The chip is connected to a memory, and is configured to read and execute a software program stored in the memory, to implement any one of the methods in the foregoing method embodiments.

An embodiment of this application further provides a computer storage medium. The computer storage medium stores computer-readable instructions. When reading and executing the computer-readable instructions, a computer may complete any one of the methods in the foregoing method embodiments.

An embodiment of this application further provides a computer program product including a software program. When the computer program product runs on a computer, the computer is enabled to perform any one of the methods in the foregoing method embodiments.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-readable storage media (including but not limited to a disk memory, an optical memory, and the like) that include computer instructions.

The objectives, technical methods, and beneficial effects of this application have been described in detail in the foregoing embodiments. It should be understood that the foregoing descriptions are merely specific implementations of this application, but are not intended to limit the protection scope of this application. Any modifications and variations made on the basis of the technical solutions of this application shall fall within the protection scope of this application.

What is claimed is:

1. An application discovery method comprising:
    obtaining, by a first session management function (SMF) network element, a first domain name requested by a terminal device;
    sending the first domain name to a second SMF network element, comprising:
        determining, based on the first domain name and a stored correspondence between location information of an application platform and a domain name of an application, the location information of at least one application platform on which a first application corresponding to the first domain name is located; and
        sending, based on a location information list comprising the location information of the at least one application platform on which the first application is located, the first domain name to the second SMF network element; and
    receiving first information from the second SMF network element, wherein the first information comprises information about a first application platform or an IP address of a domain name system DNS server corresponding to the first application platform, wherein the first application platform is an application platform on which the first application corresponding to the first domain name is located, and wherein the first information relates to a target internet protocol IP address corresponding to the first domain name.

2. The method according to claim 1, wherein the obtaining the first domain name requested by the terminal device comprises:
    receiving the first domain name from a user plane function (UPF) network element, wherein the first domain name is received by the UPF network element from the terminal device.

3. The method according to claim 1, wherein the method further comprises, before the obtaining the first domain name requested by the terminal device:
    receiving, from the second SMF network element, the location information list corresponding to the second SMF network element, wherein the location information list comprises location information of the at least one application platform corresponding to the second SMF network element;
    determining second information based on the location information list; and
    sending the second information to the second SMF network element, wherein the second information comprises the first domain name and location information of the at least one application platform on which the first application corresponding to the first domain name is located.

4. The method according to claim 1, wherein the information about the first application platform comprises location information of the first application platform or an IP address corresponding to the first application platform.

5. The method according to claim 3, wherein the location information list comprises a data network access identifier (DNAI) list, and wherein the location information of the at least one application platform on which the first application corresponding to the first domain name is located comprises a DNAI corresponding to the at least one application platform on which the first application is located.

6. An application discovery method, comprising:
    receiving, by a second session management function (SMF) network element, from a first SMF network element, a first domain name requested by a terminal device, wherein the first domain name is sent by the first SMF network element based on:
        determining, based on the first domain name and a stored correspondence between location information of an application platform and a domain name of an application, the location information of at least one application platform on which a first application corresponding to the first domain name is located; and
        sending, based on a location information list comprising the location information of the at least one application platform on which the first application is located, the first domain name to the second SMF network element;
    determining based on current location information of the terminal device and based on location information of the at least one application platform on which the first application corresponding to the first domain name is located, a first application platform on which the first application corresponding to the first domain name is located; and
    sending first information to the first SMF network element, wherein the first information comprises information about the first application platform or an IP address of a DNS server corresponding to the first application platform, and wherein the first information relates to a target IP address corresponding to the first domain name.

7. The method according to claim 6, wherein the method further comprises, before the receiving, from the first SMF network element, the first domain name requested by the terminal device:
    sending, to a first network element, the location information list corresponding to the second SMF network element, wherein the location information list comprises location information of the at least one application platform corresponding to the second SMF network element, and wherein the first network element is the first SMF network element or a unified data repository (UDR); and
    receiving second information from the first network element, wherein the second information comprises the first domain name and the location information of the at least one application platform on which the first application corresponding to the first domain name is located.

8. The method according to claim 6, wherein the information about the first application platform comprises location information of the first application platform or an IP address corresponding to the first application platform.

9. The method according to claim 7, wherein the location information list comprises a data network access identifier (DNAI) list, and wherein the location information of the at least one application platform on which the first application corresponding to the first domain name is located comprises a DNAI corresponding to the at least one application platform on which the first application is located.

10. An application discovery apparatus, comprising:
a processor; and
a non-transitory computer-readable storage medium storing a program to be executed by the processor, the program including instructions to:
obtain a first domain name requested by a terminal device;
determine, based on the first domain name and a stored correspondence between location information of an application platform and a domain name of an application, the location information of at least one application platform on which a first application corresponding to the first domain name is located;
send, based on a location information list comprising the location information of the at least one application platform on which the first application is located, the first domain name to a second session management function (SMF) network element; and
receive first information from the second SMF network element, wherein the first information comprises information about a first application platform or an IP address of a domain name system (DNS) server corresponding to the first application platform, wherein the first application platform is an application platform on which the first application corresponding to the first domain name is located, and wherein the first information is for obtaining a target internet protocol IP address corresponding to the first domain name.

11. The application discovery apparatus according to claim 10, wherein instructions further include instructions to:
receive the first domain name from a user plane function (UPF) network element, wherein the first domain name is received by the UPF network element from the terminal device.

12. The application discovery apparatus according to claim 10, wherein instructions further include instructions to:
receive, the location information list corresponding to the second SMF network element, wherein the location information list comprises location information of the at least one application platform corresponding to the second SMF network element;
determine second information based on the location information list; and
send the second information to the second SMF network element, wherein the second information comprises the first domain name and location information of the at least one application platform on which the first application corresponding to the first domain name is located.

13. The application discovery apparatus according to claim 10, wherein the information about the first application platform comprises location information of the first application platform or an IP address corresponding to the first application platform.

14. The application discovery apparatus according to claim 12, wherein the location information list comprises a data network access identifier (DNAI) list, and wherein the location information of the at least one application platform on which the first application corresponding to the first domain name is located comprises a DNAI corresponding to the at least one application platform on which the first application is located.

15. An application discovery apparatus, comprising:
a processor; and
a non-transitory computer-readable storage medium storing a program to be executed by the processor, the program including instructions to
receive, from a first session management function (SMF) network element, a first domain name requested by a terminal device, wherein the first domain name is sent by the first SMF network element based on:
determining, based on the first domain name and a stored correspondence between location information of an application platform and a domain name of an application, the location information of at least one application platform on which a first application corresponding to the first domain name is located; and
sending, based on a location information list comprising the location information of the at least one application platform on which the first application is located, the first domain name corresponding to the application discovery apparatus;
determine, based on current location information of the terminal device and location information of the at least one application platform on which the first application corresponding to the first domain name is located, a first application platform on which the first application corresponding to the first domain name is located; and
send first information to the first SMF network element, wherein the first information comprises information about the first application platform or an IP address of a DNS server corresponding to the first application platform, and wherein the first information relates to a target IP address corresponding to the first domain name.

16. The application discovery apparatus according to claim 15, wherein instructions further include instructions to:
send to a first network element, the location information list corresponding to the application discovery apparatus, wherein the location information list comprises location information of the at least one application platform corresponding to the application discovery apparatus, and wherein the first network element is the first SMF network element or a unified data repository (UDR); and
receive second information from the first network element, wherein the second information comprises the first domain name and the location information of the at least one application platform on which the first application corresponding to the first domain name is located.

17. The application discovery apparatus according to claim 15, wherein the information about the first application platform comprises location information of the first application platform or an IP address corresponding to the first application platform.

18. An application discovery system, wherein the system comprises:

a first session management function (SMF) network element configured to:

obtain a first domain name requested by a terminal device;

determine, based on the first domain name and a stored correspondence between location information of an application platform and a domain name of an application, the location information of at least one application platform on which a first application corresponding to the first domain name is located;

send, based on a location information list comprising the location information of the at least one application platform on which the first application is located, the first domain name to a second SMF network element; and receive first information from the second SMF network element, wherein the first information comprises information about a first application platform or an IP address of a domain name system DNS server corresponding to the first application platform, wherein the first application platform is an application platform on which the first application corresponding to the first domain name is located, and wherein the first information relates to a target internet protocol IP address corresponding to the first domain name; and the second SMF network element configured to:

receive, from the first SMF network element, the first domain name requested by the terminal device;

determine, based on current location information of the terminal device and location information of the at least one application platform on which the first application corresponding to the first domain name is located, the first application platform on which the first application corresponding to the first domain name is located; and send the first information to the first SMF network element.

* * * * *